United States Patent [19]

Cowan et al.

[11] Patent Number: 5,019,998
[45] Date of Patent: May 28, 1991

[54] KNOWLEDGE SYSTEM AND METHOD FOR SIMULATING CHEMICAL CONTROLLED RELEASE DEVICE PERFORMANCE

[75] Inventors: Christina E. Cowan; Peter Van Voris; Gary P. Streile, all of Richland; Dominic A. Cataldo, Kennewick, all of Wash.; Frederick G. Burton, West Jefferson, Ohio

[73] Assignee: Battelle Memorial Institute, Richland, Wash.

[21] Appl. No.: 303,770

[22] Filed: Jan. 30, 1989

[51] Int. Cl.[5] .............................................. G06F 15/20
[52] U.S. Cl. ................................... 364/496; 364/513; 364/578; 364/510
[58] Field of Search ............... 364/496, 578, 188, 200, 364/900, 513, 510

[56] References Cited

PUBLICATIONS

"A Controlled Release Herbicide Device for Multiple Year Control of Roots and Waste Burial Sites", Journal of Controlled Release 3 (1986) pp. 47-54, Burton et al.
"Long-Term Biobarriers to Plant and Animal Intrusions of Uranium Tailings", PNL-4340, Cline et al. (Sep. 1982).
"Controlled Release Delivery Systems", Roseman et al. (1983).
"Behavior Assessment Model for Trace Organics in Soil: I", Jury et al., J. Environ. Qual., vol. 12, No. 4, 1983.
"Behavior Assessment Model for Trace Organics in Soil: III", Jury et al., J. Environ. Qual., vol. 13, No. 4, 1984.
"Behavior Assessment Model for Trace Organics in Soil: IV," Jury et al., J. Environ. Qual., vol. 13, No. 4, 1984.
"Behavior Assessment Model for Trace Organics in Soil: II" Jury et al., J. Environ. Qual., vol. 13, No. 4, 1984.
"Simulation of Trifluralin Diffusion in the Soil", Solie et al., ASAE Transactions 1984: 1463-1476; 1474.
"Design and Evaluate Performance of Biobarrier Geotextile Fabrics Containing Root-Growth Inhibiting Herbicides", Report to Reemay Inc. (not published).
"The Effect of Temperature on Pesticide Phase Partitioning, Transport, and Volatilization from Soil", Streile, G. P., 1984 Ph.D. Dissertation, University of California, Riverside.

Primary Examiner—Parshotam S. Lall
Assistant Examiner—Ellis B. Ramirez
Attorney, Agent, or Firm—Willian Brinks Olds Hofer Gilson & Lione

[57] ABSTRACT

A knowledge system for simulating the performance of a controlled release device is provided. The system includes an input device through which the user selectively inputs one or more data parameters. The data parameters comprise first parameters including device parameters, media parameters, active chemical parameters and device release rate; and second parameters including the minimum effective inhibition zone of the device and the effective lifetime of the device. The system also includes a judgemental knowledge base which includes logic for 1) determining at least one of the second parameters from the release rate and the first parameters and 2) determining at least one of the first parameters from the other of the first parameters and the second parameters. The system further includes a device for displaying the results of the determinations to the user.

17 Claims, 33 Drawing Sheets

KNOWLEDGE SYSTEM AND METHOD FOR SIMULATING CHEMICAL CONTROLLED RELEASE DEVICE PERFORMANCE

A portion of the disclosure of this patent document contains material Which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

This invention relates generally to a knowledge system and more particularly to a knowledge system for determining the environmental performance of specific chemical controlled release devices, the effects of combinations of polymers and carriers on the release rate from the device, and the characteristics of the controlled release device that will meet specified design performance characteristics.

Methods for controlling plant root growth into below ground repositories containing buried nuclear and chemical wastes, insect intrusion into Wood structures, fungal attack on Wood structures, and rodent intrusion into food storage and shipping containers have been subjects of recent research. While a number of chemicals are available for controlling plant, fungi, insect, and rodent intrusion, concerns have been raised about the safety of current technologies with regard to both human health and safety and potential impacts to the environment. Furthermore, chemicals must be applied repeatedly to provide effectiveness over long periods. Recent research efforts have been directed toward developing chemical controlled release devices which result in effective control over long periods but avoid or limit human health and environmental concerns.

Two basic requirements are imposed on development of such chemical controlled release systems. First, the active chemical must be environmentally safe and acceptable. Accordingly, the actiVe chemical must have a reasonably short half-life, exhibit little soil mobility and cause the desired effect only in the prescribed zone. This criteria requires a device and/or method Which delivers the active chemical at a controlled delivery rate and in a prescribed zone. Further, the cost of replacement must be minimized. This criteria requires a system that remains active for extended period of time (10–100 years).

The technology which has been developed to meet these two requirements is implemented by devices that are known as chemical controlled release devices. These devices are based on the principle of long-term controlled release of an active chemical from a polymeric delivery system.

For example, such systems are disclosed in U.S. Pat. application Ser. Nos. 06/555,113, filed Nov. 23, 1983 which is a Continuation In Part of 06/314,809, and 06/314,810 both filed on Oct. 26, 1981; 07/086,757, filed Aug. 18, 1987, 07/072,080 filed July 10, 1987; and 07/091,918 filed Sept. 1, 1987 the contents of these applications being incorporated herein by reference. Such controlled release systems act as a reservoir for the pure active chemical, protecting it from photochemical, chemical, and biological degradation. In addition, the system provides a method for controlled release of the chemical into the surrounding environment. The chemical released into the environment surrounding the device establishes an effective zone of action. Thus, the polymeric delivery system maintains an effective dose of the active chemical for a substantial length of time in a zone surrounding the device. These systems provide advantages over single application methods Which typically result in higher than necessary concentrations immediately after treatment which subsequently degrade to a level beloW the minimum effective dose.

As an example, ongoing research has resulted in the development of a series of sustained release, polymeric delivery systems using trifluralin as a root growth inhibiting chemical. These devices were developed for protecting below ground burial sites from plant root penetration for periods from 75–100 years, as discussed by Cline et al. in "Long-Term Biobarriers to Plant and Animal Intrusions of Uranium Tailings," PNL 4340, Pacific Northwest Laboratory, Richland, Wash., 1982.

Recently proposed systems include a fabric, such as spunbonded polypropylene, with sustained release devices thermally applied to the base fabric. Such a device would control unwanted vegetation growth for periods of 10–100 years. These devices are more fully described in U.S. Pat. application Ser. Nos. 06/555,113, 07/072,080, 07/091,918 and 07/086,757 which are referred to above. It is envisioned that these devices may find several types of industrial and commercial applications, in addition to protection of nuclear and chemical waste disposal sites, where control of plant growth and intrusion is of primary concern.

Various geometric configurations and methods for producing these controlled release devices have been developed. For example, one process involves injection molding of hemispherical pellets directly to spun-bound geotextile fabric, as disclosed in U.S. Pat. application Ser. No. 07/086,757. Other variations in this basic method may include variations in the specific geometric configuration of the controlled release device nodules on the fabric, Variation in the concentration of the inhibition chemical in the controlled release devices, variations in the matrix of these controlled release nodules such as type of polymer or carrier used, and Variations in the type of active chemical. For example, suitable polymers include polyethylene, polypropylene, polyvinyl acetate, polyurethane, poly-vinyl chloride, ethylene propylene rubber, polyester, thermoplastic elastomer, and silicon rubber. In addition, the formulation of the controlled release devices may have a Wide variation. One example includes a controlled release device which consists of 68% powdered polyethylene (USI Microthene 710-20), 18% carbon black (Monarch 1100 from the Cabot Corporation) and 24% trifluralin (available as Treflan). As will be recognized by those skilled in the art, many other variations and combinations of these and other materials are possible.

Additional potential geometric configurations include polymer containing gaskets as disclosed in U.S. Pat. application Ser. No. 06/555,113. Other configurations under consideration are webbing, tubes, and ropes containing the chemical controlled release system.

Because several potential configurations of the chemical controlled release device are possible depending on the type of control desired and the most advantageous method of application, a system is required as a tool to aid in the design of potential controlled release devices. This method or tool needs to be able to determine the performance characteristics of a proposed control device and to determine the optimal composition of a device to meet performance objectives in a specified environment.

As discussed in more detail below, the performance characteristics of a device are related to the release rate of the active chemical from the device. Therefore, the system must have the ability to predict the effect of the shape of the device and the composition of the device (i.e., type and percentage of polymer, concentration of active chemical, and the type and percent of carrier) on the release rate.

Two aspects of the release rate are particularly relevant to the controlled release device design and application. First, the device must be able to release the active chemical at a predictable, controlled rate that is effective in causing the desired effect. Second, the device must be able to limit the release rate to the minimal required values, thus extending the useful life of the device by not depleting the reservoir of active chemical in the device unnecessarily.

In addition, the designer of the specific controlled release device requires a tool for determining the effect that different system characteristics, including characteristics of the media into which the chemical will be released and device characteristics, will have on the effectiveness and lifetime of the proposed device under different conditions. For example, a system user may need to determine the optimal release rate to ensure a certain effective lifetime of a controlled release device. In another situation the system user may want to determine the effect that changes in the shape, size or composition of the controlled release device will have on the release rate and the effective zone and lifetime of the device. The user may also need to determine the effect of the media characteristics or the compositional characteristics of the device on effectiveness and lifetime.

Therefore, in view of the above it is the primary object of the present invention to provide a knowledge system that can be used as an engineering design tool for chemical controlled release devices.

It is a more specific object of the present invention to proVide a system for simulating the effective zone around a controlled release device.

It is a further specific object of the present invention to provide a system for simulating the effective lifetime of a controlled release device.

It is a further specific object of the present invention to provide a system for evaluating the environmental performance of controlled release devices with specified parameters in causing the desired effect either totally or with some degree of selectivity.

It is still a further specific object of the present invention to provide a system for determining the compatibility of polymers, carriers and active chemicals in providing a controlled release device with the desired performance characteristics.

SUMMARY OF THE INVENTION

To achieve the foregoing and other objects and in accordance with the purposes of the present invention, the knowledge system and method of the present invention provides a system for simulating the performance of a controlled release device which produces sustained and controlled release of an active chemical into a surrounding media. The system includes input means which allows the user to selectively input one or more data parameters. The data parameters comprise first parameters including device parameters, media parameters, active chemical parameters and device release rate; and second parameters including the minimum effective inhibition zone of the device and the effective lifetime of the device. The system also includes a judgmental knowledge base which includes logic for determining at least one of the second parameters from the release rate and the first parameters and for determining at least one of the first parameters from the other of the first parameters and the second parameters. The system further includes a device for displaying the results of the determinations to the user.

In this manner the user of the system can select which of the first or second parameters are to be simulated given a system with the non-simulated parameters. The system can thus be used to design a controlled release device system.

In a preferred embodiment, the judgmental knowledge base also includes logic for calculating the effective lifetime of the controlled release device from the given release rate. In this preferred embodiment the system includes a database containing soil parameters, physical/chemical parameters for active chemicals, and parameters defining the effect of device composition on the device's release rate. The present invention thus provides a system for determining the characteristics of a controlled release device Which meets specified performance characteristics.

Additional objects, advantages, and novel features of the invention will be set forth in part in the description which follows, and in part will become apparent to those skilled in the art upon examination of the following or may be learned by practice of the invention. The objects and advantages of the invention may be obtained by means of the instrumentalities and combinations, particularly pointed out in the appended claims.

DETAILED DESCRIPTION OF THE PRESENTLY PREFERRED EMBODIMENT

Figure 1:
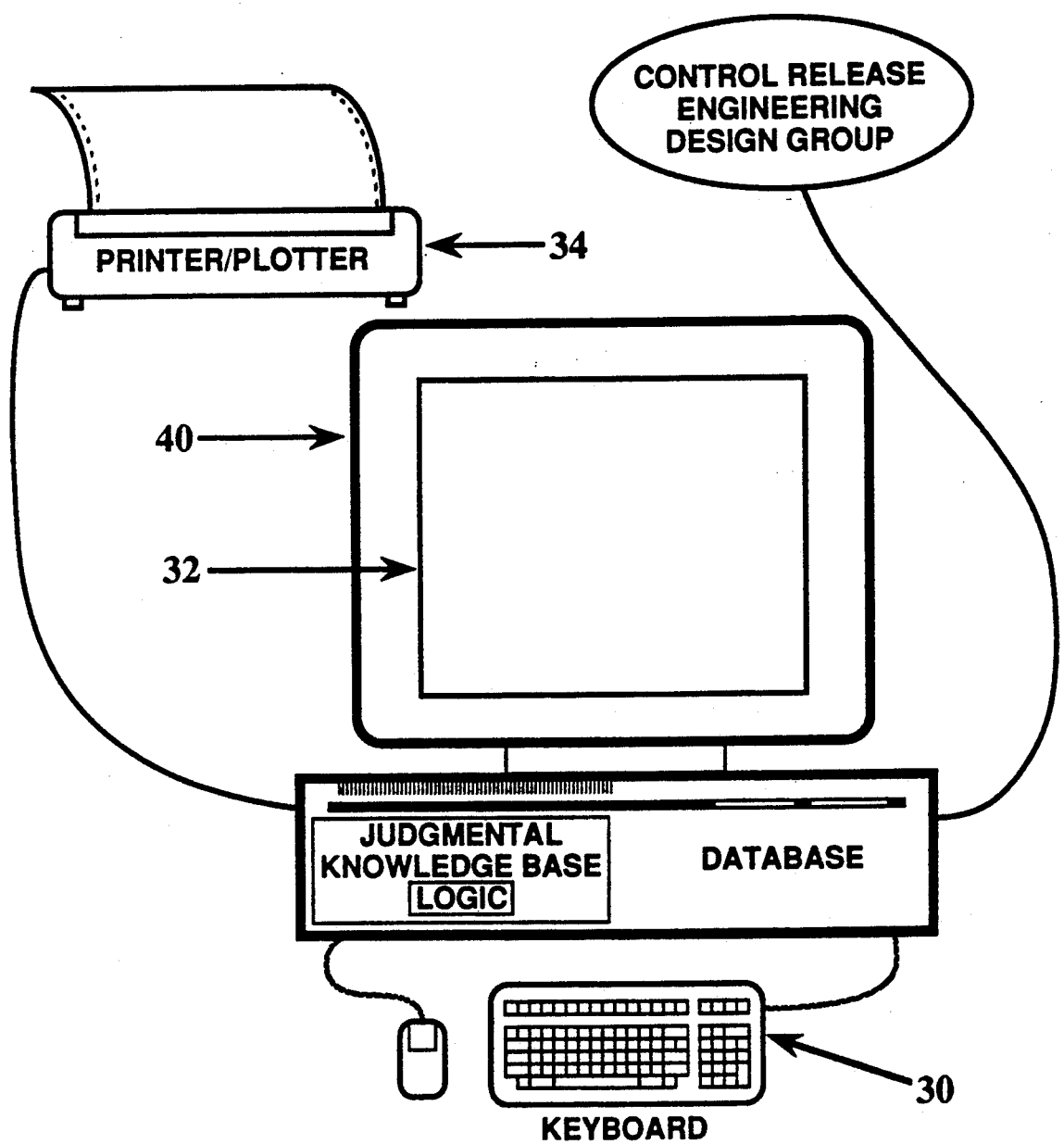
FIG. 1 illustrates a preferred embodiment of the knowledge system of the present invention.

Referring now specifically to FIG. 1, a preferred embodiment of the knowledge system, designated generally by reference numeral 40, is illustrated. The knowledge system 40 permits the user to estimate the performance of a device that releases active chemical at a controlled and sustained rate. As used hereinafter an "active chemical" is defined as a chemical that has pesticidal or herbicidal properties or acts by other means to repel animals or plants; and the term "device" refers to an apparatus that results in controlled and sustained release of an active chemical from its surface. The knowledge system calculates or estimates the effective distance from the surface of the device within which the desired effect is exhibited and the effective lifetime of the device. The knowledge system thus may be used in the development of controlled release devices that meet specified performance criteria.

The knowledge system 40 preferably comprises a computer system including a program which utilizes two routines which 1) calculate the effective zone around the device, and 2) calculate the effective lifetime of the device. These two calculation routines are linked through the release rate of the device. Included as Appendix 1 of this specification is a program listing of CONREL an exemplary embodiment of a program for predicting the effective lifetime and effective inhibition zone from a controlled release of the active chemical from a device.

In the preferred embodiment, the calculations are made for a quasi-steady state where soil parameters as Well as the device parameters are constant. Because in a real environment the soil parameters will vary with time depending on the environmental conditions, the results produced by the presently preferred embodiment are considered to be approximate and to represent primarily a conservative estimate of the effective zone and the effective lifetime of the device. It will be readily apparent to those skilled in the art that more accurate results may be obtained by appropriate modifications to the program logic described below.

Figure 2:
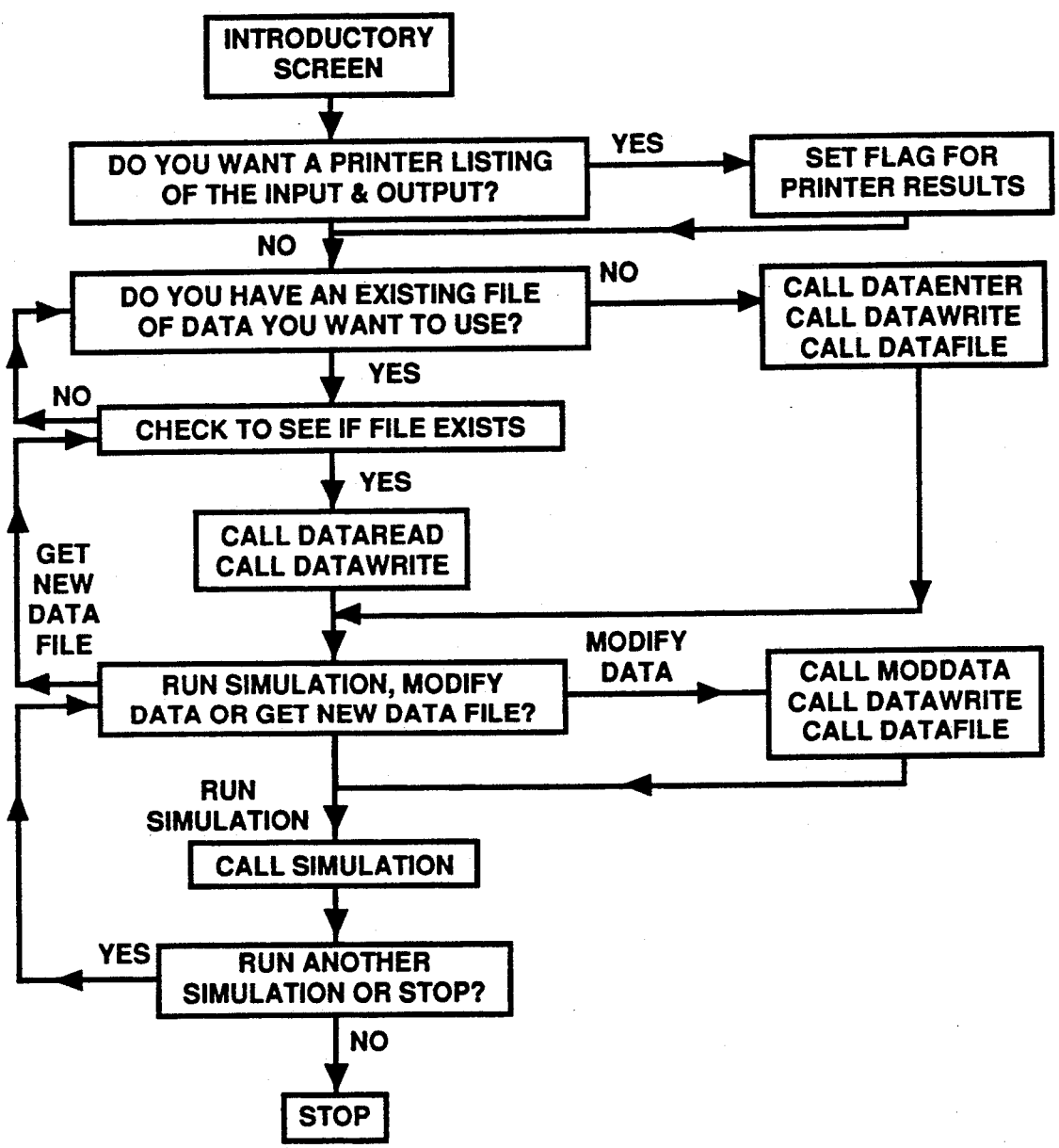
FIG. 2 is a flowchart of a preferred embodiment of the logic for the overall system program for the system to interact with the user.
Figure 3:
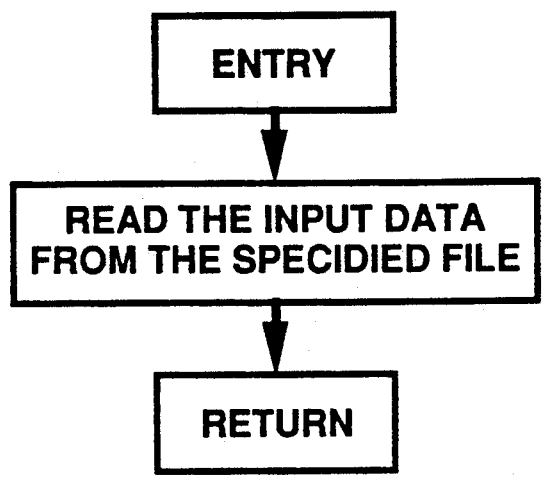
FIGS. 3 and 4 are flowcharts of a preferred embodiment of the logic for reading and writing data parameters from an existing file.
Figure 4:
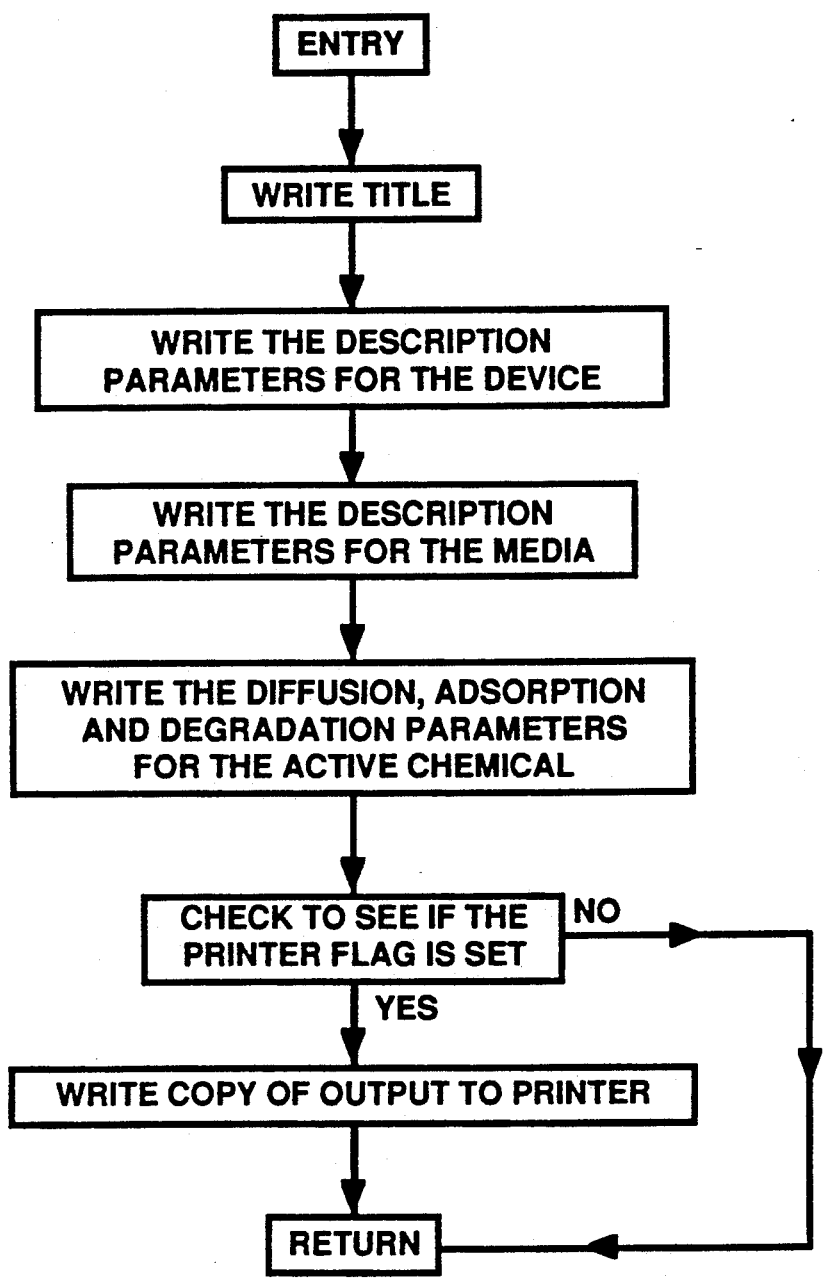
Figure 5A:
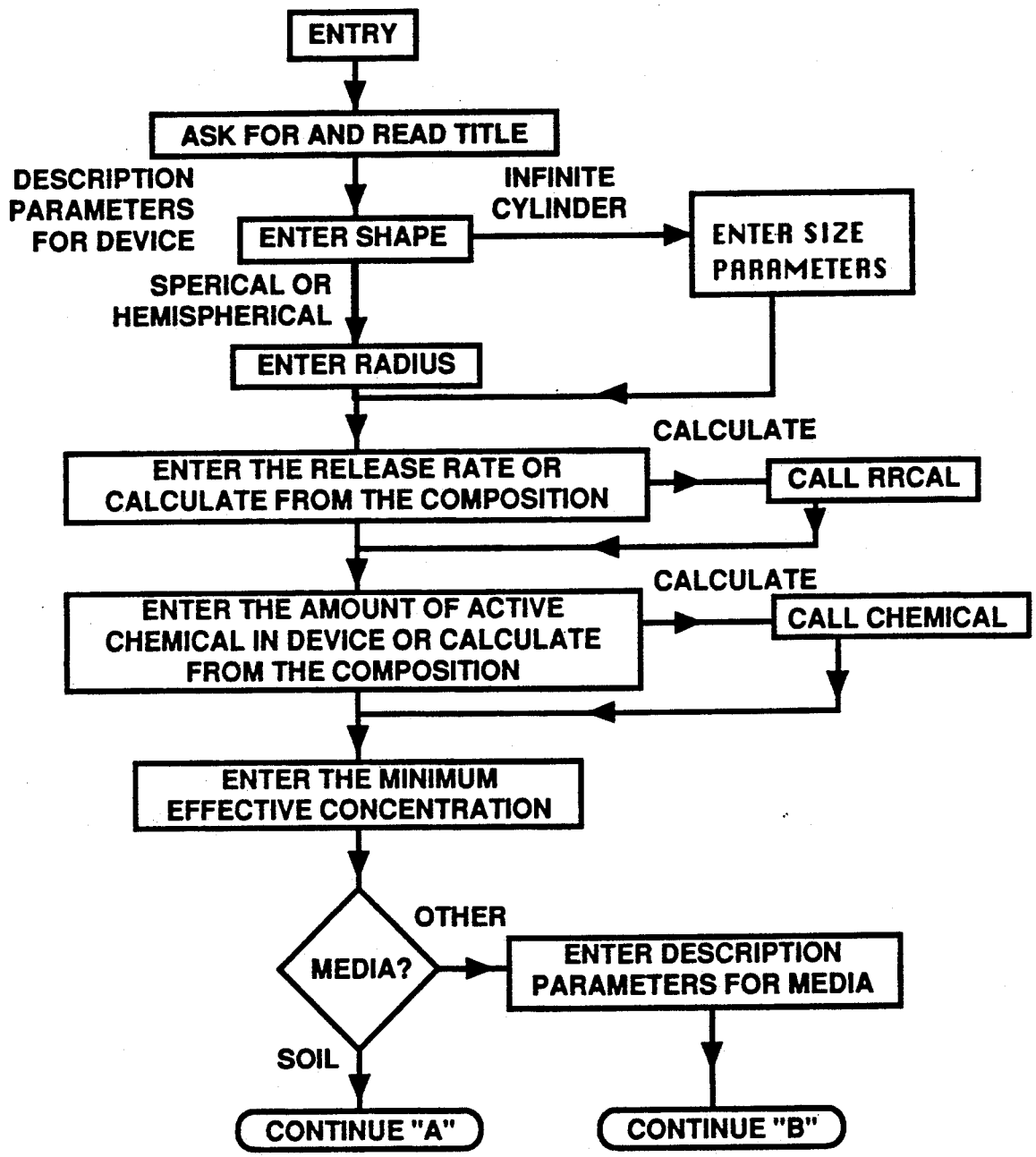
FIGS. 5a-5d illustrate a flowchart of a preferred embodiment of the logic for entering data parameters.
Figure 5B:
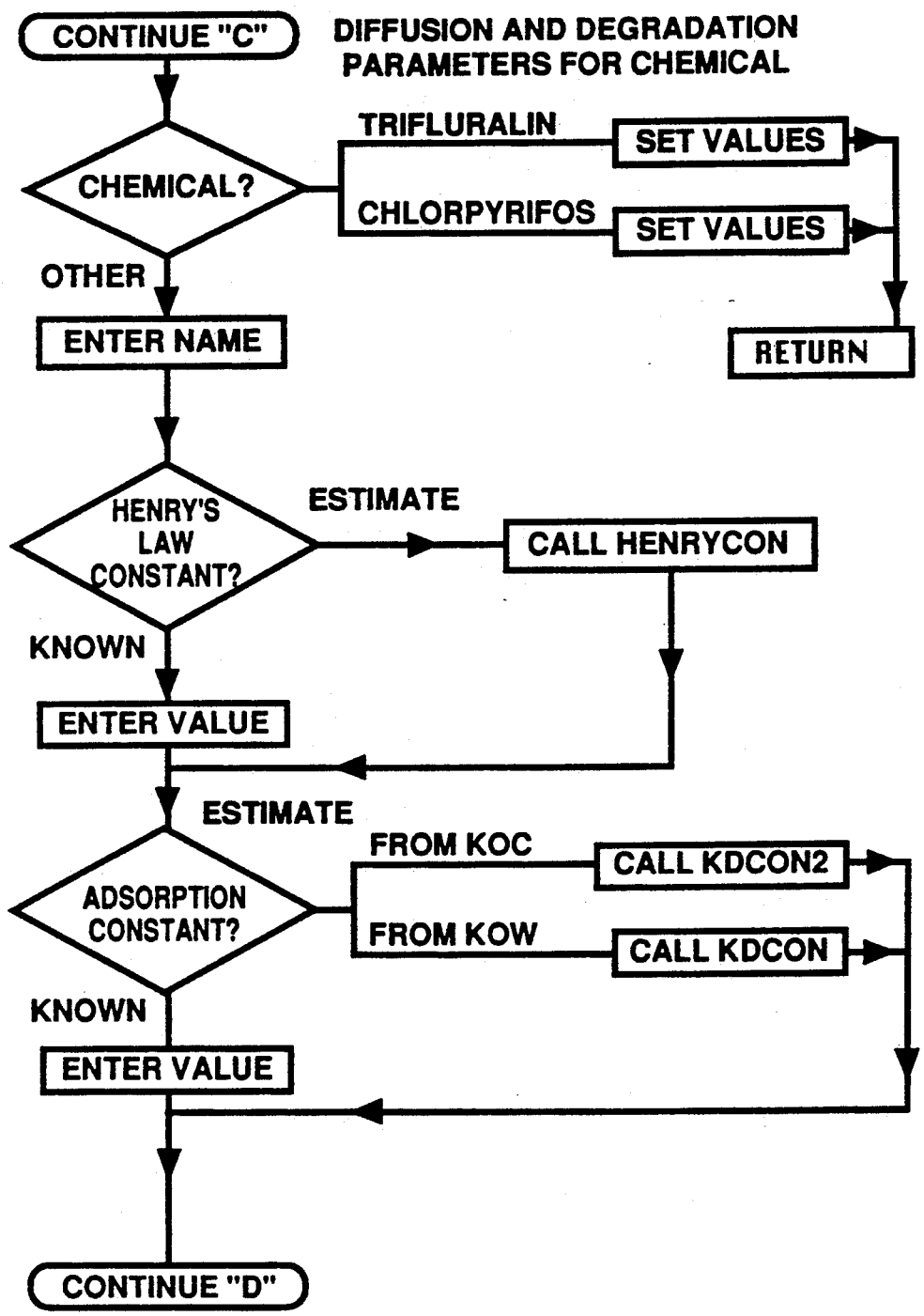
Figure 5C:
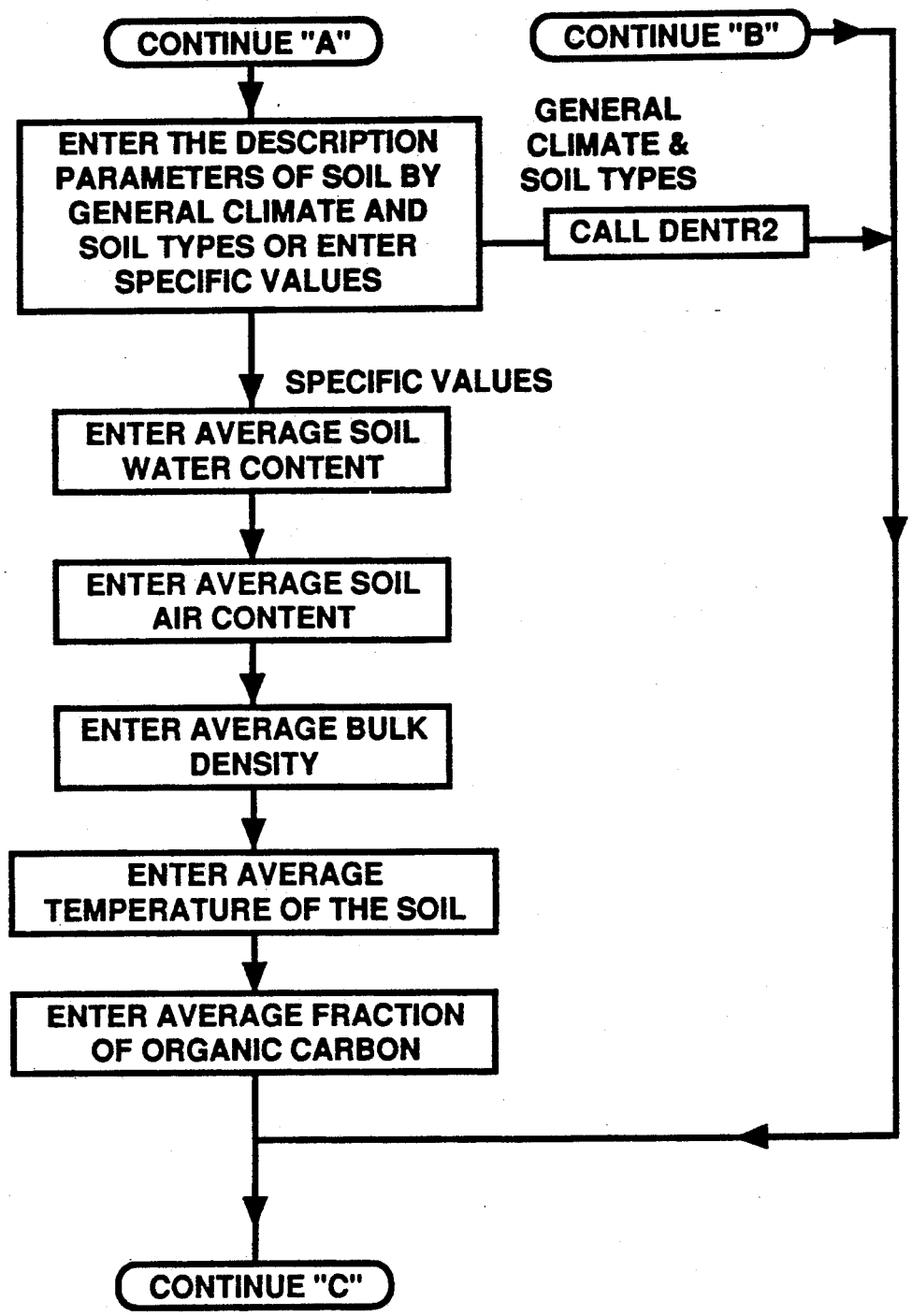
Figure 5D:
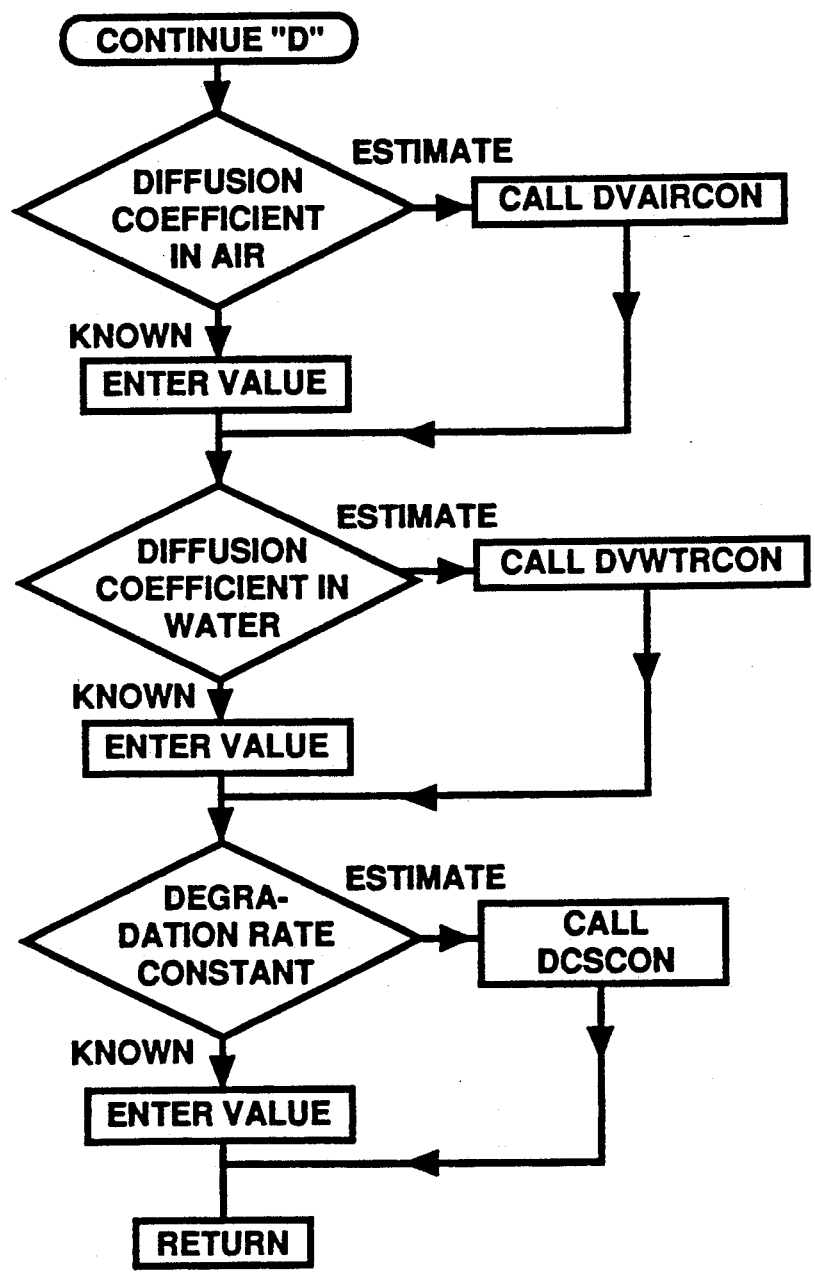

In the preferred embodiment, the system 40 includes predetermined logic to interact with the user. As illustrated in the flowchart FIG. 2, the knowledge system 40 first prompts the user for basic information about the manner in which the user wants to run the program. The system 40 first queries Whether the user wants a simultaneous printer listing of the input data and simulation results for the user's records. The user interacts with the knowledge system 40 by inputting data into the system using any suitable input means such as a keyboard 30 and receiving information from the system on any suitable display means such as a screen 32 or a printer 34. The user then inputs the response by entering the data using any suitable input means such as keyboard 30. The system 40 then queries whether the user already has a set of data in a file that he wants to use for the present simulation. As illustrated in FIGS. 3 and 4, if the answer is yes then the program queries the user for the name of the file. If the file is found, the data will be retrieved by the system 40 and printed on the screen 32 for the user's information. (If the file is not found an error message will appear and the program will return to the question asking whether there is a file which the user wants to use).

Next, the knowledge system 40 prompts the user for the data required to run the simulation. FIG. 5 illustrates a preferred embodiment of the logic of this feature. The system first interacts with the user to enter the title of the simulation.

The next set of data requested by the system 40 is the device parameters. The device parameters include the shape of the device, the radius of the device, the release rate, the amount of active chemical in the device and the minimum effective concentration of the active chemical in the surrounding media. A current exemplary embodiment of the system includes predetermined logic for two shapes of devices: spherical and hemispherical. In this exemplary embodiment the system request that the user input the radius of the device.

In a more preferred embodiment which is contemplated, the system will include logic for other shapes such as the infinite cylinder to simulate rope shaped devices. To add these shapes to the system 40, the logic for calculating the concentration profiles around the devices, as well as effects of shape on release rate and the amount of chemical in the device must be added.

In the preferred embodiment, several options exist for specifying the release rate and the amount of the active chemical in the device. (These options are discussed in more detail below.) Finally, the user of the knowledge system enters the minimum effective concentration which may vary with the particular type of effect which needs to be controlled, the organism to be controlled, and the placement and configuration of the controlled release device.

The release rate of the active chemical is the driving parameter for both the effective zone and the effective lifetime calculations that are described below. In the present preferred embodiment the release rate of the device is specified by the user either as a constant input parameter or as a function of the device composition (i.e. the carrier, active chemical and polymer). In the preferred embodiment there are three options available for entering the release rate of the active chemical. The different options (discussed in more detail immediately below) will be most useful depending on the objectives of the simulation study.

The first option is to enter the release rate as a constant per day basis. This rate will remain constant even if the shape and size of the device or the composition of the device changes.

A second option is to enter the release rate as a constant on an area as well as a per day basis. In this case the total amount released on a given day will depend on the size and shape of the device but will not vary if the composition of the device varies.

Figure 6:
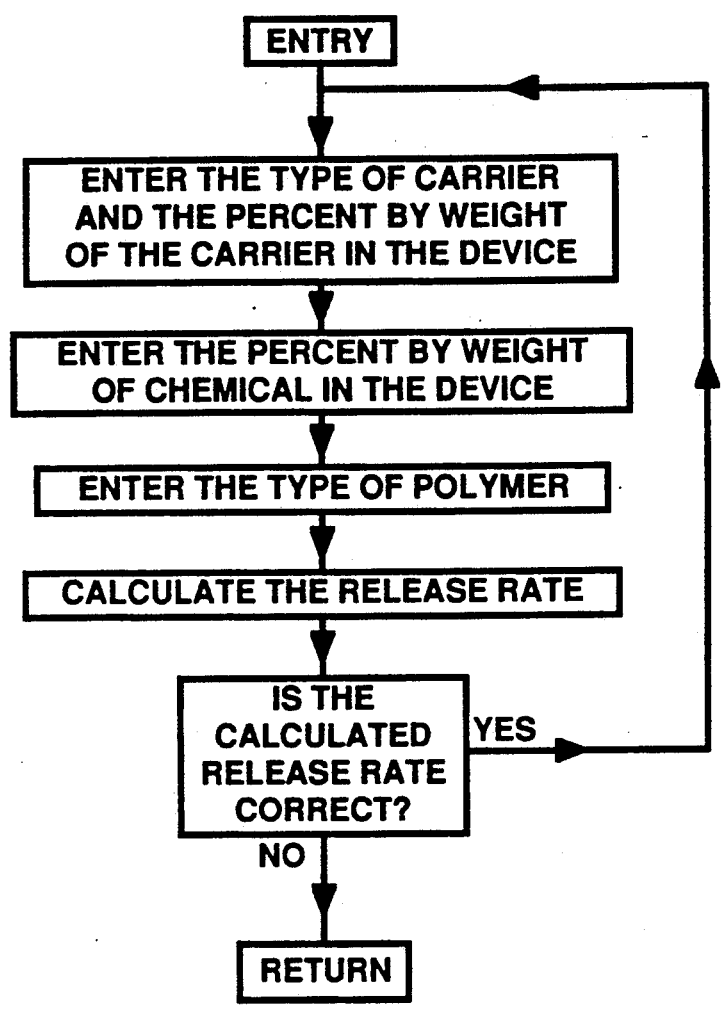
FIG. 6 is a flowchart of a preferred embodiment of the logic for the subroutine for calculating the release rate from the composition of the device.

The third option is to allow the release rate to be calculated from the composition of the device. A flowchart for the logic of this option is illustrated in FIG. 6. The system 40 queries the user about the percent composition of active chemical and carrier and about the type of polymer and carrier used. The system 40 includes logic which includes a defined relationship between the type of polymer and/or carrier used in the device and the release rate of the active chemical. In the present preferred embodiment the functional relationship which is used Was developed using data in Burton et al. "A Controlled Release Herbicide Device for Multiple Year Control of Roots and Waste Burial Sites" J. Controlled Release Volume 3, pp. 47–54 (1986), Cline et al. "Long-Term Biobarriers to Plan and Animal Intrusions of Uranium Tailings" PNL-4340 and Van Voris et al. "Design and Evaluate Performance of Biobarrier Geotextile Fabrics Containing Root-Growth-Inhibiting Herbicides" Report to REEMAY October 1987. The function used in this preferred embodiment is as follows:

$$RR1 = -3.32 + 0.0879(CARP) + 0.995(CHEMP)$$

Where RR1 is the release rate at 13 degrees centigrade for a device composed of carbon Black as the carrier and Polyethylene as the polymer;
CARP is the percent of carrier; and
CHEMP is the percent of chemical.

To compute the release rate for a device with different carrier and/or polymer the preferred embodiment first determines whether the proposed active chemical, carrier and polymer mixture is compatible. If the mixture is compatible, the ratios of the release rates for these different carriers to carbon black and the different polymers to polyethylene must be specified. The final release rate is computed as follows:

$$RR = RR1 * fac2 * fac3$$

Where RR is the release rate for the specified polymer and carrier combination at 13 degrees centigrade;
fac2 is the ratio of release rates for the polymer; and
fac3 is the ratio of the release rates for the carrier.

In an exemplary embodiment, the database contains the ratios for the following polymers: poly(ethylene-vinylacetate), polyester, poly(ether urethane), polypropylene, and silicone rubber, and for the following carrier: Vulcan XC-70. This database was developed from data in Cline et al. "Long-Term Biobarriers to Plant and Animal Intrusions of Uranium Tailings" PNL-4340 and Van Voris et al. "Design and Evaluate Performance of Biobarrier Geotextile Fabrics Containing Root-Growth-Inhibiting Herbicides" Report to REEMAY October 1987. It will be recognized by those skilled in the art that the invention contemplates the addition of data for other polymers and carriers as such data becomes available.

In the preferred embodiment, the user can choose among the polymers and carriers or specify the release rate ratios for a polymer or carrier that is not in the database. The release rate will remain constant if the size or shape of the device changes but will vary with the composition of the device. After the release rate is calculated for the specified composition, the rate is printed on the screen 32 and the user has the option of accepting the value or of reentering the data and calculating a new rate.

In a more preferred embodiment which is contemplated, the knowledge system will also include logic for determining the compatibility and for computing the release rate for a polymer-carrier-chemical combination for which this information has not been previously determined. The logic will compare the values of the solubility parameter ($\delta$) for the polymer-carrier combination With the solubility parameter of the active chemical proposed for use in the controlled release device. The solubilities may be compared, either directly or as a ratio. This comparison of the solubility parameters will give an indication of whether the polymer-chemical combination will result in a compatible mixture which could provide controlled-release. If the polymer-carrier combination has a $\delta$ value similar to or less than that of the active chemical then a controlled release device using this composition appears to be feasible. However, if the $\delta$ value for the polyser-carrier combination is greater than the value for the active chemical then development of a device with controlled release may not be possible. The release rate from the proposed device will be calculated by comparing the solubility parameter to the solubility parameters for a polymer-chemical combination for Which release rates and $\delta$ values are known.

Figure 7:
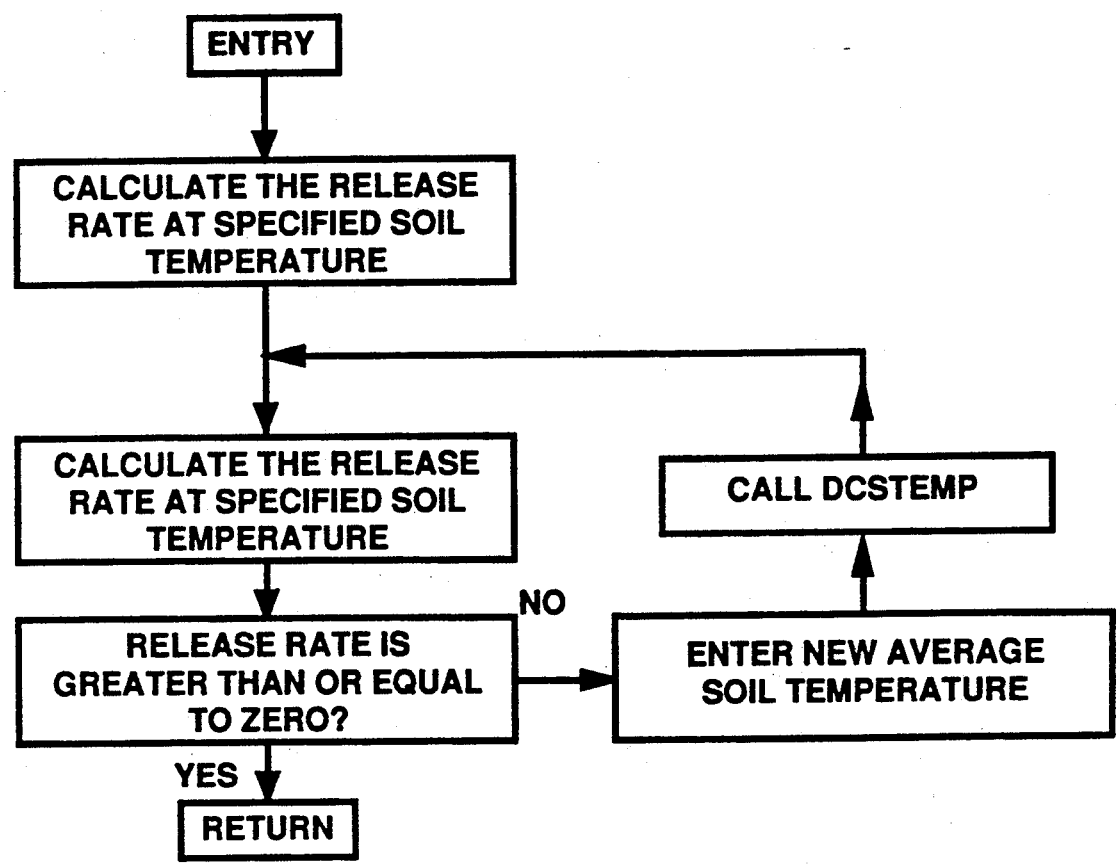
FIG. 7 is a flowchart of a preferred embodiment of the logic for the subroutine for calculating the release rate as a function of temperature.

The release rate is dependent on the temperature to which the device is exposed. A flowchart for a preferred embodiment of the logic used to calculate the release rate as a function of temperature is illustrated in FIG. 7. The release rate function is derived from data in Burton et al. "A Controlled Release Herbicide Device for Multiple Year Control of Roots and Waste Burial Sites" J. Controlled Release Volume 3, pp. 47–54 (1986). The equation used in the presently preferred embodiment is as follows:

$$RRT = RR\ -3.72 + \exp((0.16)(TEMP) - 0.78)$$

Where RRT is the release rate at the appropriate temperature;
TEMP is the temperature in degrees centigrade;
RR is the release rate at 13 degrees centigrade; and exp refers to the natural or Naperian based exponential function.

In the preferred embodiment, the amount of the active chemical in the device may be entered in one of two ways. As in the entry of the release rate the choice of the option will depend on the objective of the simulation.

The first option is to enter the amount of the active chemical as a constant. The amount of active chemical in the device will not change as the size or shape of the device changes. This option may be used to evaluate the relationship between the total amount of the active chemical and the effective lifetime of the device.

Figure 8:
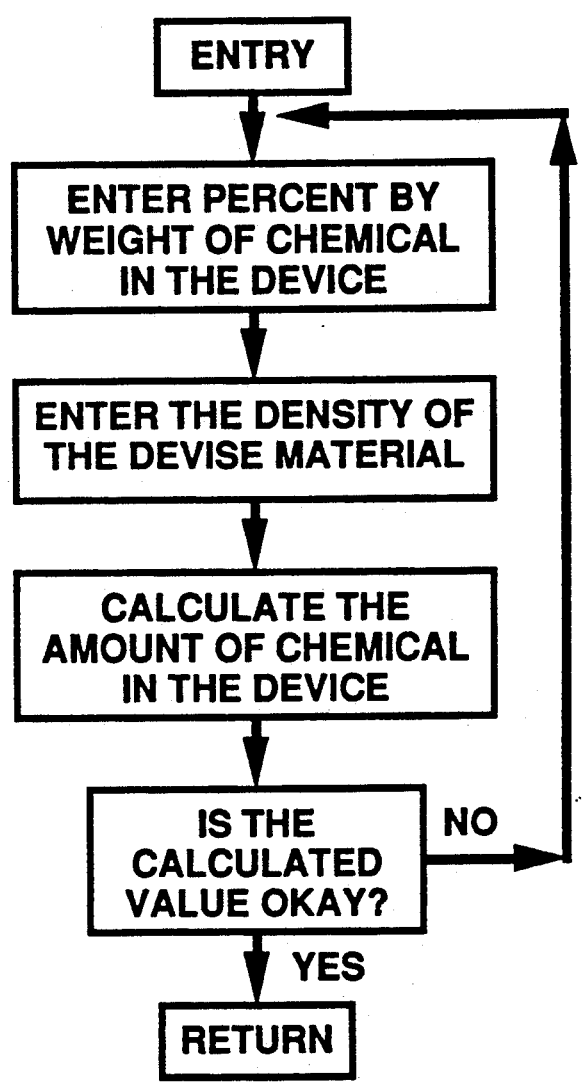
FIG. 8 is a flowchart of a preferred embodiment of the logic for a subroutine for calculating the amount of an active chemical in a device as a percentage of the total mass of the device.

The second option allows the user to enter the amount of the active chemical as a percentage of the total mass of the device. A preferred embodiment of the logic for a subroutine to implement this feature is illustrated in FIG. 8. In this option it is assumed that the relative mix of the chemicals in the device is constant The total amount of the active chemical in the device will change as the shape and size of the device changes The equation used to determine the total amount of the active chemical in the presently preferred embodiment is as follows:

$$CHEMA = (CHEMP)(DENS)(VOL)(0.01)$$

Where CHEMA is the total amount of active chemical (mg);

CHEMP is the percent of active chemical in the device;

DENS is the density of the device (mg/cm3);

DEVR is the device radius (cm);

VOL is the volume of the device which is $1.333(DEVR\ 3)(\pi)$ for a spherical device; and $1.333(DEVR\ 3)(\pi)(0.5)$ for a hemispherical device;

where signifies that the value of the variable is raised to the specified power.

The second part of input data requested by the system 40 relates to the description parameters for the media into which the active chemical is released In the preferred embodiment of the invention, the system requests information on and contains a database on the characteristics of the media, such as the soil.

In a current preferred embodiment, the system allows the user to enter the media parameters for soil in one of two ways —general soil and climate characteristics or specific parameter values. The characteristics required are soil water content, soil air content, bulk density, temperature and organic carbon content. A more preferred embodiment is contemplated which will include request for information on and databases for other types of media, such as wood and cement.

Figure 9:
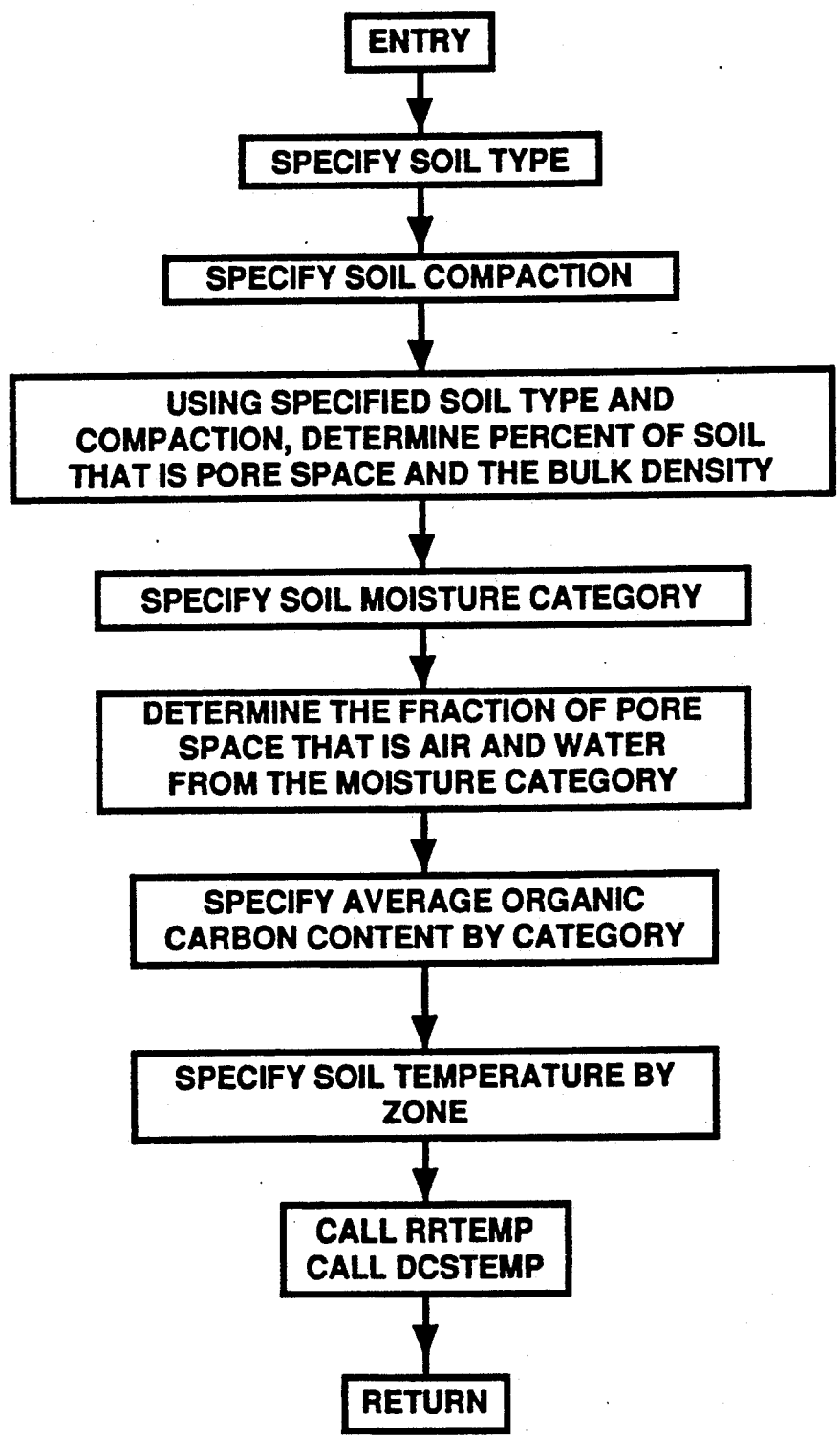
FIG. 9 is a floWchart of a preferred embodiment of the logic for a subroutine for entering specified soil and climate categories.

In the present preferred embodiment, the first option allows the user to specify general soil and climate categories, using broad classifications, to derive average values for each of the soil parameters that are representative of the general climate or soil type. FIG. 9 illustrates a flowchart of preferred embodiment for the logic for this option. The values specified by this option tend to be conservative and will primarily be useful in determining the broad effects of changes in soil type and climate characteristics on the performance of the controlled release device.

The type of soil may be specified as either sandy, loamy or clayey. The general characteristics of the three types of soil are given below in Table 2. Most commonly the soil will be specified as a loamy soil which has characteristics intermediate to the sandy or clayey soils.

The bulk density and the amount of pore space in the soil will depend on the degree of compaction of the soil. Tight compaction will occur if the soil is low in organic carbon and/or has been compacted by heavy equipment. Loose compaction will occur in soils with organic carbon content that have been tilled or spaded. Medium compaction falls between these two extremes. Most surface soils are likely to be medium to loose in compaction whereas the subsoils are generally more compact. The characteristics of sandy soil tend to vary less due to compaction than the characteristics of loamy or clayey soils.

The relative amount of the pore space in the soil that is Water or air depends on the moisture content of the soil. The moisture content may be specified by the user as dry, medium or wet. Dry soil is soil that would be found in desert or draught conditions and does not receive watering. In this case, the pore space is primarily occupied by air. Wet soil is soil that is heavily Watered or receives lots of precipitation and is essentially close to being waterlogged. In this case, the pore space is primarily occupied by water. The medium condition represents the average soil with approximately equal distribution of air and water in the pore space.

The sorption of the active chemical on the soil is dependent on the organic carbon content of the soil; therefore, the organic carbon content of the soil is preferably specified by the user. The range in organic carbon content of soil ranges from 0.5 to 15%. The low organic carbon content will be found most commonly in sandy soils, while the finer textured soils, loam and clay, tend to have slightly higher organic carbon contents. Cultivated soils, especially those in Which organic matter is added in the form of manure, compost or back tillage Will tend to have higher organic carbon content. Higher soil temperature tends to decrease the amount of organic carbon in the soil and increased soil moisture tends to increase the amount to organic carbon in the soil.

Figure 10:
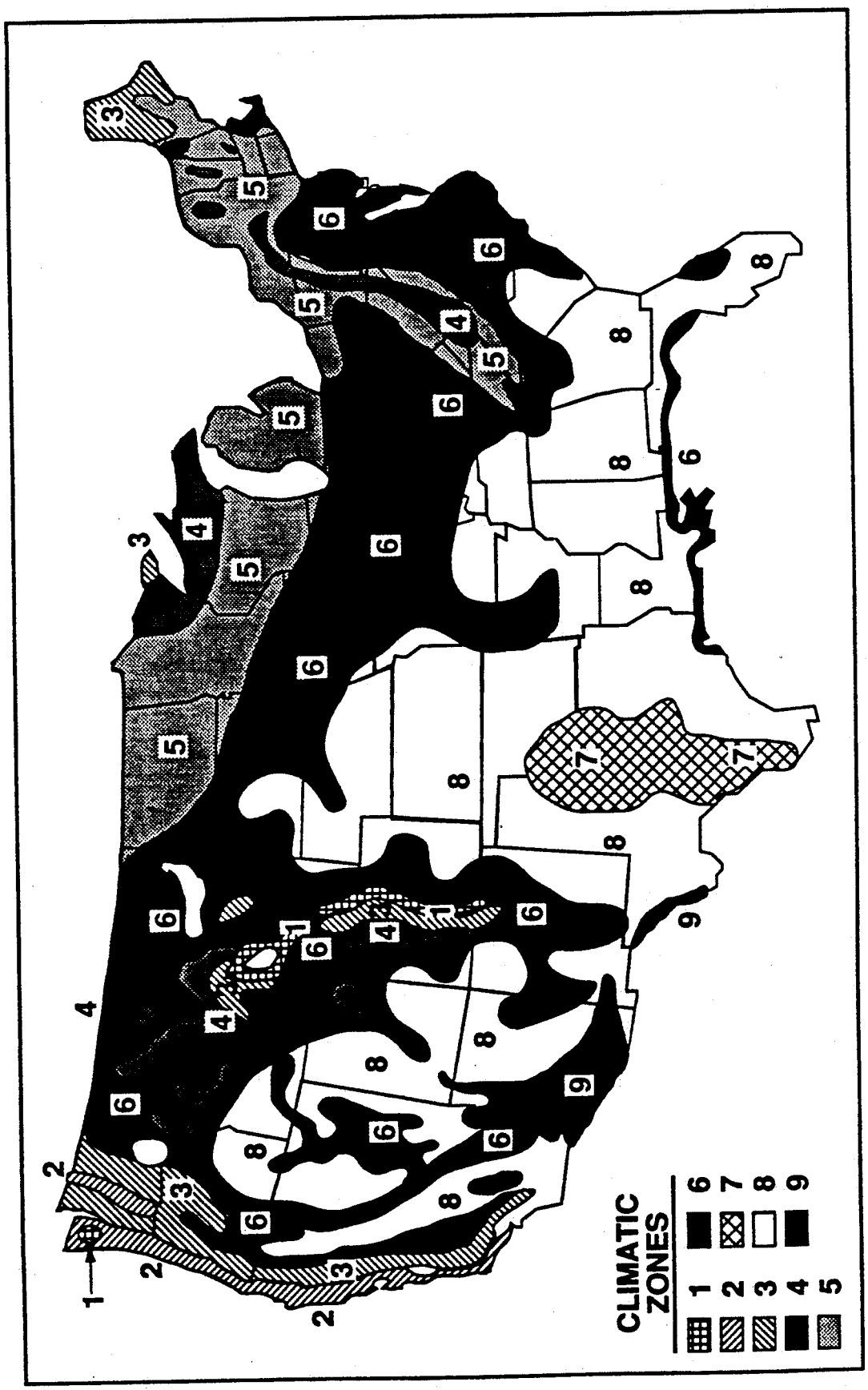
FIG. 10 is a map illustrating general climate zones for the United States.

The soil temperature is a particularly important parameter since it influences both the release rate from the device and the decomposition rate of the active chemical. In the present preferred embodiment, the soil temperature is conservatively estimated as a weighted average for the year and specified by temperature zones. As an example, the temperatures chosen to represent specified zones throughout a specified region, such as regions in the United States, are given in Table 1. FIG. 10 illustrates the zones specified in Table 1 on a map of the United States. The temperature specified for each zone will result in conservative but reasonable estimates of both the effective inhibition zone and the effective lifetime of the device, because the temperatures are higher than they are likely to be during specific times during the year. Thus, the release rates and degradation rates are higher than would be expected at other times of the year. To determine the effect of slightly lower temperatures, the user may either use a different temperature zone or an specify the temperature directly.

Table 1 lists the specific values for soil parameters Which are available in a preferred embodiment of the database of the invention for each of the general soil and climate types.

TABLE 1

Specific Parameter Values for the Different Climate and Soil Types

BULK DENSITY AND PORE SPACE

|  | Bulk Density | % Pore Space |
|---|---|---|
| Sandy Soil Type | | |
| Tight Compaction | 1.75 | 35 |
| Medium Compaction | 1.4 | 40 |
| Loose Compaction | 1.2 | 50 |
| Loam Soil Type | | |
| Tight Compaction | 1.8 | 40 |
| Medium Compaction | 1.45 | 45 |
| Loose Compaction | 1.1 | 55 |
| Clayey Soil Type | | |
| Tight Compaction | 2.0 | 30 |
| Medium Compaction | 1.5 | 50 |
| Loose Compaction | 1.0 | 60 |

PERCENT OF PORE SPACE OCCUPIED BY AIR AND WATER

| Moisture Content of Soil | Water | Air |
|---|---|---|
| Dry soil | 20 | 80 |
| Medium soil | 50 | 50 |
| Wet soil | 80 | 20 |

AVERAGE ORGANIC CARBON CONTENT

| Low Organic Carbon | 1% |
|---|---|
| Medium Organic Carbon | 5% |
| High Organic Carbon | 15% |

SOIL TEMPERATURE ZONES

| Zone | Temperature (degrees fahrenheit) | Temperature (degrees centigrade) |
|---|---|---|
| 1 | 45 | 7 |
| 2 | 50 | 10 |
| 3 | 59 | 25 |
| 4 | 74 | 25 |
| 5 | 76 | 24 |
| 6 | 70 | 21 |
| 7 | 62 | 17 |
| 8 | 67 | 19 |
| 9 | 82 | 28 |

The second option for entering the media characteristics allows the user to enter specific values for each of the soil characteristics. A preferred embodiment of the logic for this option is illustrated in FIG. 5. The option chosen will depend, of course, on the objective of the simulation. If the option to enter a specific set of parameter values to represent the soil characteristics is chosen, the system 40 queries the user for the five values. The system 40 first queries the user with questions concerning the average water and air content of the soil. The air and water content of the soil will depend on the type of soil and the moisture content of the soil. The total pore space of the soil (sum of water and air content) typically ranges from 0.30 to 0.60. The fraction of this total pore space that is occupied by water depends on the moisture content of the soil. Even for the wettest soil some of the pore space will be occupied by air and vice versa for water in dry soil. Organic matter will also affect the moisture content of the soil. The system then queries the user for the bulk density of the soil. This value is dependent on the type of soil and its degree of compaction. Typically the value will fall between 1.0 and 2.0 grams per centimeter cubed with loose soil being lighter and compacted soil being heavier. The fine textured soils, loam and clay, tend to have the widest variation in bulk density. Average bulk density is typically 1.45 grams per centimeter cubed Next, the system queries the user for the average soil temperature in degrees centigrade. Finally, the system queries the user for the average organic carbon content of the sediment. The average soil organic carbon content ranges from 0.005 to 0.15 grams of carbon per gram of soil with a medium value of approximately 0.05 grams per gram of soil.

As illustrated in FIG. 5, the third set of data requested by the system 40 is data on the characteristics of the active chemical. These data include the Henry's Law Constant, the diffusion coefficients in pore water and pore air, the adsorption constant and the first-order degradation rate constant. The parameter values for the specific active chemical may be either entered by the user or preferably the parameter values for some chemicals may be available in the database of the knowledge system 40. In a present exemplary embodiment, the database contains the parameter values for one specific chemical, trifluralin. Those values are given in Table 2. In more preferred embodiments which are contemplated additions will include databases for other chemicals such as chlorpyrifos or other suitable chemicals.

TABLE 2

Basic Parameter Values for Trifluralin

| Henry's Law Constant | 6.7E-03(b) |
|---|---|
| Organic Carbon Partition Coefficient | 7.3E3 cm3/g(b) |
| Diffusion Coefficient in Pore Air | 4.98E-02 cm2/sec(a) |
| Diffusion Coefficient in Pore Water | 4.98E-06 cm2/sec(a) |
| Degradation Rate Constant in Soil at 13° C. | 1.39E-02/day(c) |

(a)Estimated from the structure of the compound
(b)from Jury et al. (1984)
(c)Estimated from half-life of 50 days from Burton et al. (1986).

Figure 11:
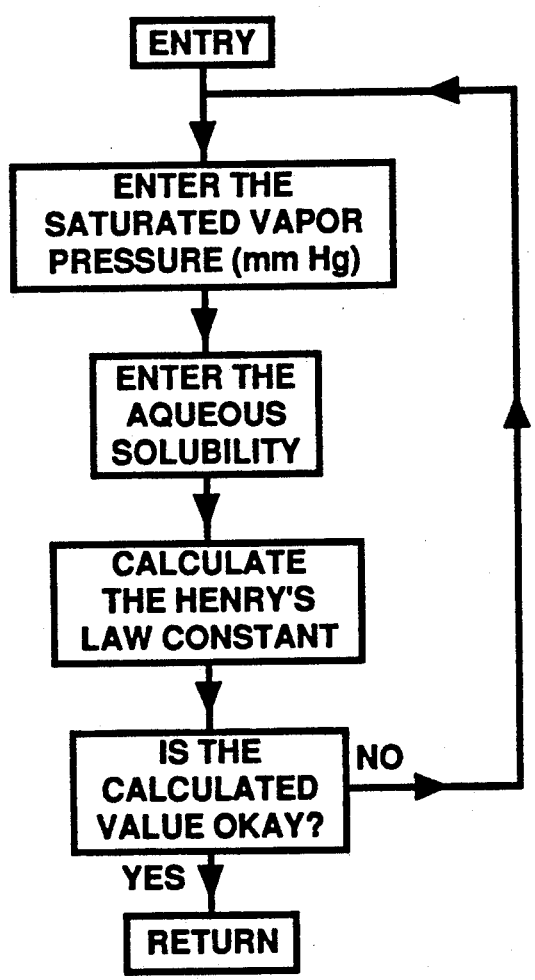
FIG. 11 is a flowchart of a preferred embodiment of the logic for a subroutine for calculating Henry's Law Constant.

In the present preferred embodiment, there are two options available for entering the Henry's Law Constant. First, if the value is known, then the value may be entered. Second if the value is not known, the constant can be estimated from the saturated vapor pressure and the aqueous solubility of the chemical. A preferred embodiment of the logic for determining the Henry's Law Constant is illustrated in FIG. 11. The equation used in the preferred embodiment is as follows:

$$HLC = ((HSVP)(28.8))/(((R)(TA)(760))/HAS)$$

Where HLC is the Henry's Law Constant;
HSVP is the saturated vapor pressure in mmHG;
R is the universal gas constant (82.0568E-03);
TA is the temperature in degrees Kelvin (273.15 + degrees centigrade); and
HAS is the aqueous solubility (ppm).

Figure 12:
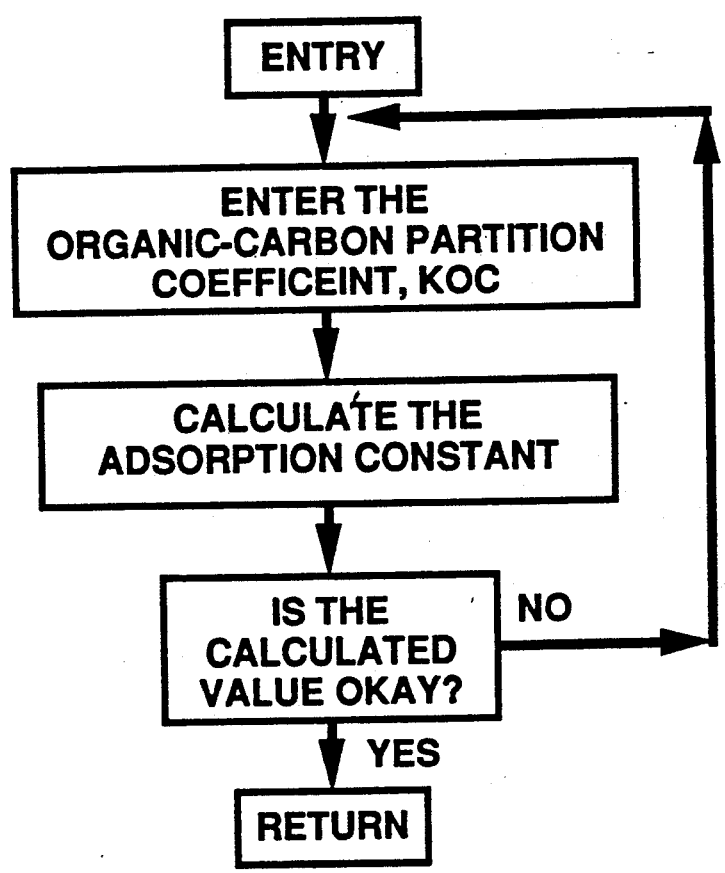
FIG. 12 is a flowchart of a preferred embodiment of the logic for a subroutine for a first method of calculating the adsorption constant.

In the present preferred embodiment, there are three options available for entering the adsorption constant. First, if the value is known, then the value can be entered. If the value is not known, then two options are available for estimating the value. First, as illustrated in the flowchart of FIG. 12, the adsorption constant for the chemical in the soil may be calculated from the organic carbon partition coefficient for the chemical and the organic carbon content of the soil. The equation for the adsorption constant used in the present preferred embodiment is as follows:

$$KD = (KOC)(KFOC)$$

Where KD is the sorption constant (cm3/g);
KOC is the organic carbon sorption constant (cm3/g); and
KFOC is the organic carbon content of the soil (g of C/g of soil).

Figure 13:
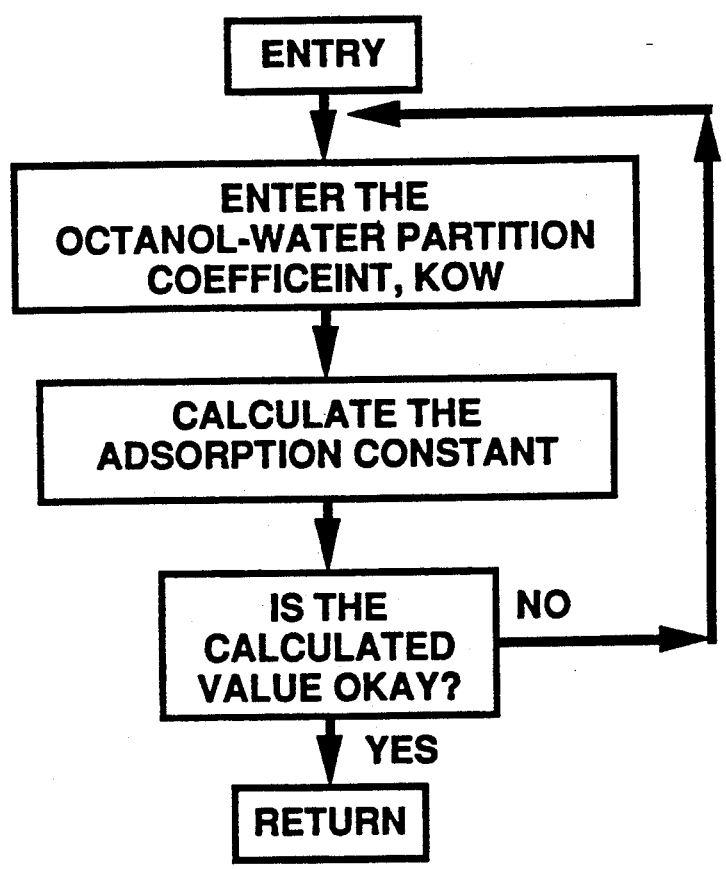
FIG. 13 is a flowchart of a preferred embodiment of the logic for a subroutine for a second method of calculating the adsorption constant.

Second, as illustrated in the flowchart of FIG. 13, the adsorption constant may be calculated from the octanol-Water partition coefficient for the chemical and the organic carbon content of the soil. The equation for the adsorption constant used in the preferred embodiment is as follows:

$$KD = (KFOC)(10 \ (0.419 + 0.881(LOG10(KOW))))$$

Where KD and KFOC are as defined previously;
KOW is the octanolwater partition coefficient; and
LOG10 is the base 10 or common logarithm function.

Figure 14:
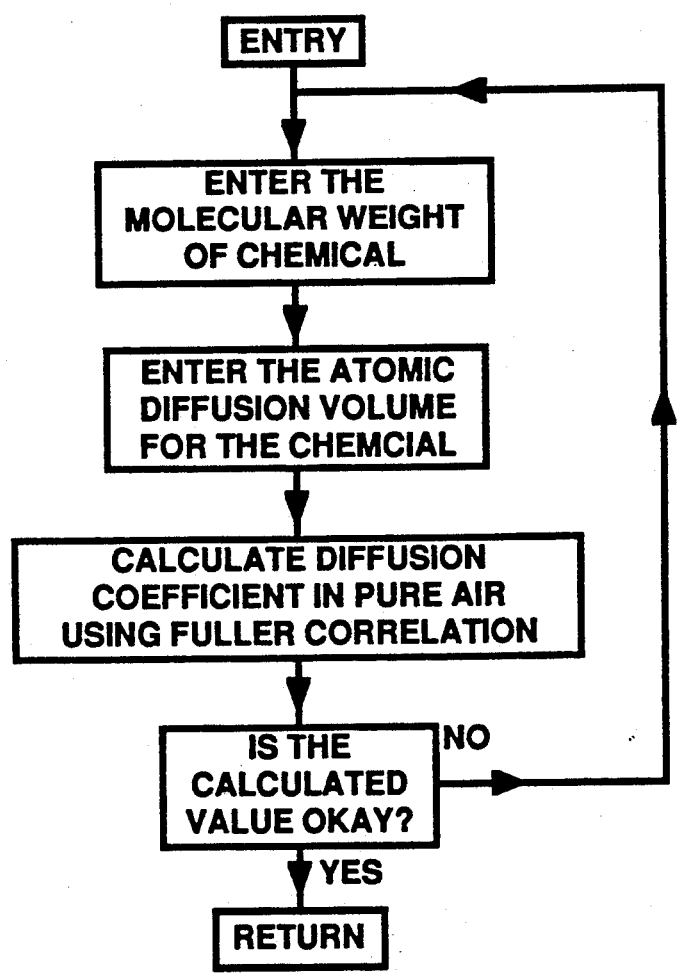
FIG. 14 is a flowchart of a preferred embodiment of the logic for a subroutine for a method of calculating the air diffusion coefficient.

In the present preferred embodiment, there are two options for entering the value for the diffusion coefficient for the chemical in pore air. First, if the value is known then it is entered. Second if the value is not known, then the value is estimated from the molecular Weight and the atomic diffusion volume of the chemical using the Fuller correlation as illustrated in the flowchart of FIG. 14. The Fuller correlation is given in Perry (1973) Chemical Engineers Handbook, 5th Edition, pp. 230–235. The equation is as follows:

$$DVAIR = ((0.001)(TA \ 1.75)SQRT((1.0/MCMF) + 1.0/28.8)/((DIFVOL \ 0.333) + (20.1 \ 0.333) \ 2)$$

Where DVAIR is the diffusion coefficient in pore air (cm 2/sec);
TA is the temperature in degrees Kelvin;
MCMF is the molecular Weight of the chemical;
DIFVOL is the diffusion volume of the chemical;
SQRT is the square root function.

Figure 15:
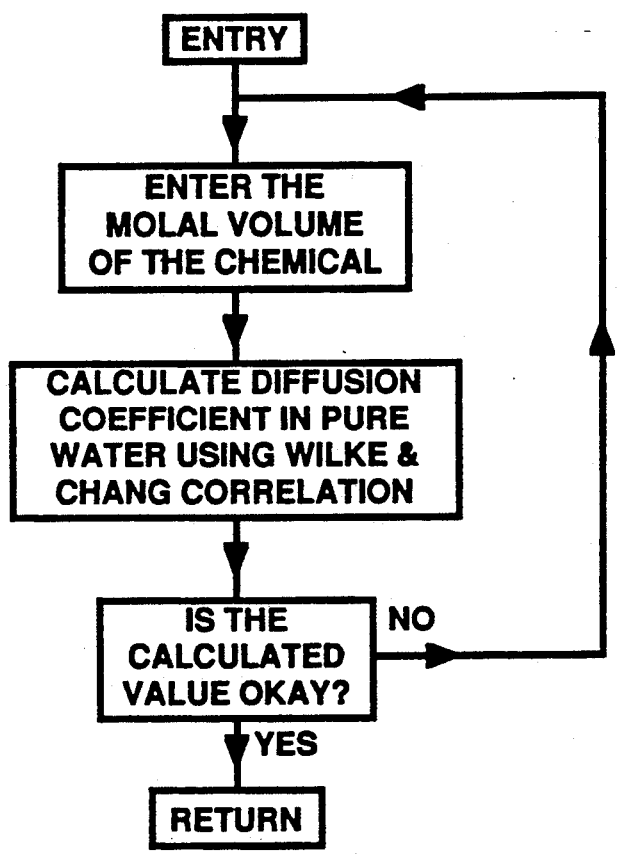
FIG. 15 is a flowchart of a preferred embodiment of the logic for a subroutine for a method of calculating the water diffusion coefficient.
Figure 16:
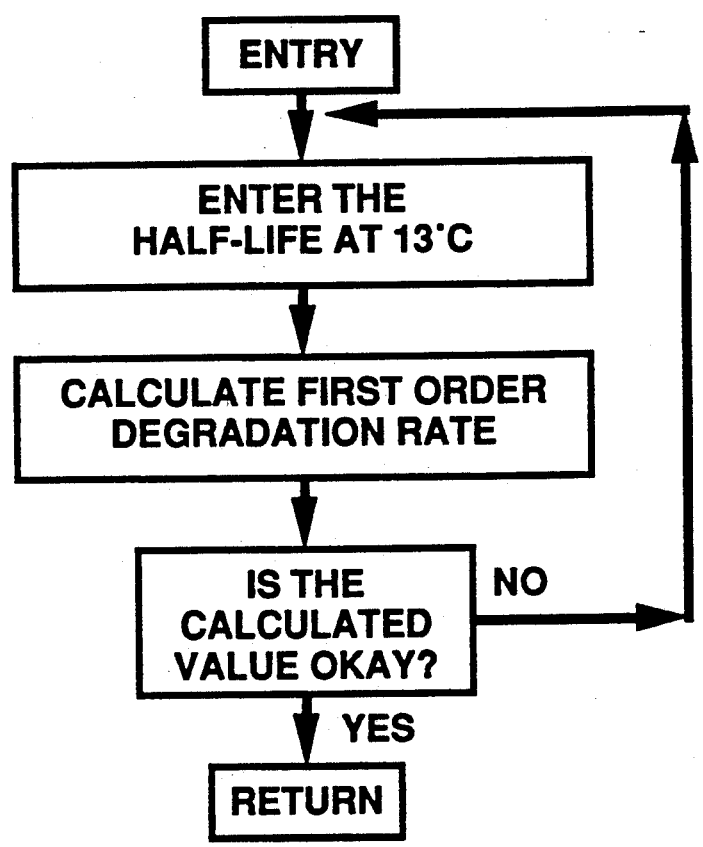
FIG. 16 is a flowchart of a preferred embodiment of the logic for a subroutine for calculating the degradation constant.

In the exemplary embodiment, there are two options for entering the diffusion coefficient for the chemical in pore water. First, if the value is known, then the value may be entered. Second, if the value is not known, then it may be estimated from the molal volume of the chemical using the Wilke-Chang correlation as illustrated in the flowchart of FIG. 15. The Wilke-Chang correlation is given in Wilke and Chang (1955) AICHE 1:264–270. The equation is as follows:

$$DVWTR = ((7.4E-8)(TA)(SQRT((2.6)(18.0)/(-MVOL \ 6)))$$

Where DVWTR is the diffusion coefficient in pore water (cm 2/sec)
TA is the temperature in degrees Kelvin
MVOL is the molal volume (cm 3)
SQRT is the square root function In the exemplary embodiment, there are two options for entering the degradation rate of the chemical. First if the value is known, then it may be entered. Second if the value is not known, it may be estimated from the half-life of the chemical, as illustrated in the flowchart of FIG. 15. The equation used in the presently preferred embodiment is as follows:

$$DCS = ((-1.0)(\log(0.5))/HALF$$

Where DCS is the decomposition rate at 13 degrees centigrade; and
Half is the half-life in days.

Figure 17:
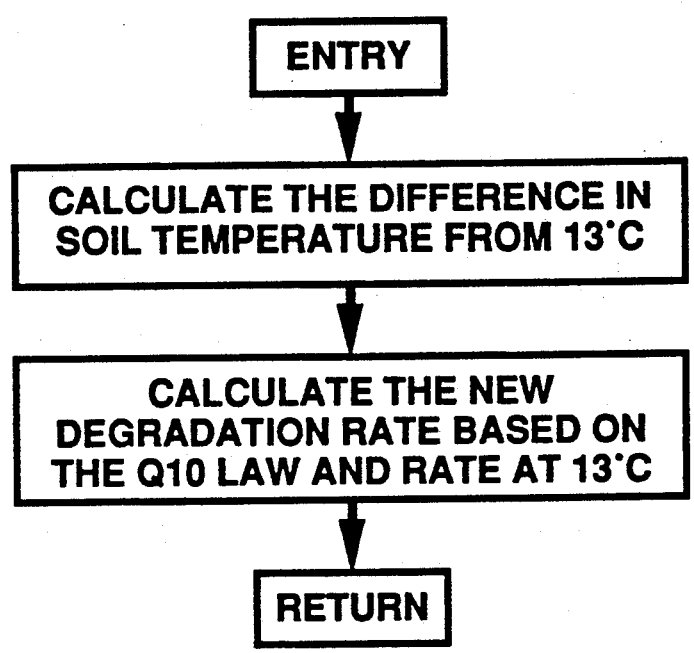
FIG. 17 is a flowchart of a preferred embodiment of the logic for a subroutine for calculating the effect of temperature on the degradation rate of the chemical.

The degradation rate of the chemical at any specified soil temperature may be calculated from the degradation rate at 13° centigrade using the Q10 relationship, as illustrated in the flowchart of FIG. 17. The equations which are used in the present preferred embodiment are as follows:

$$\text{If DELT} < \text{DCS1} = 2.0 * \text{DCS} * \text{DELT}$$

Where DCS1 is the degradation rate at the specified temperature (/day);
DCS is the degradation rate at 13° C. (/day);
DELT is (temperature −13° C.); and
DCS1 = DCS/(−2.0)(DELT).

Figure 18:
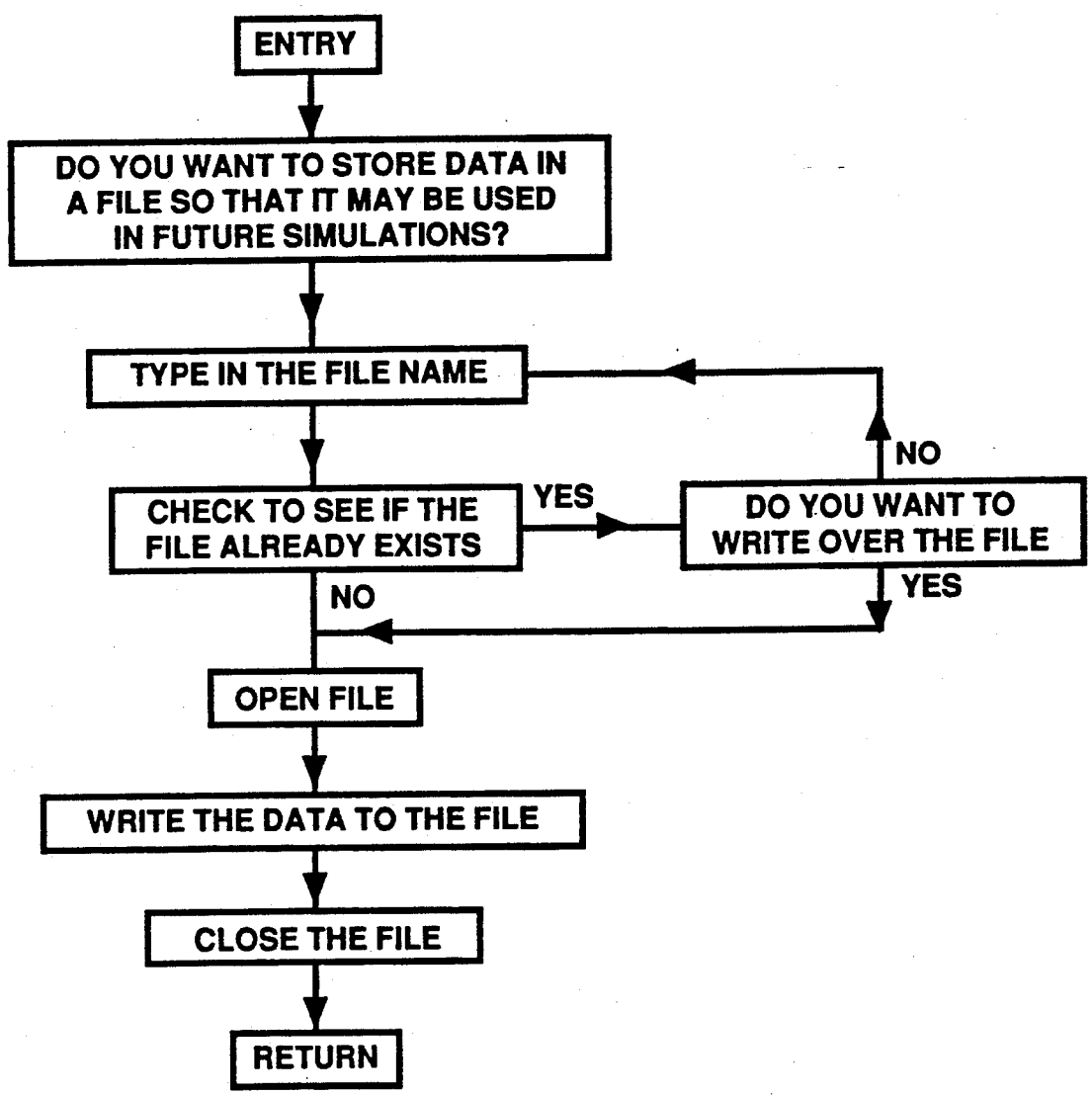
FIG. 18 is a flowchart of a preferred embodiment of the logic for a subroutine for storing data in a file.
Figure 19A:
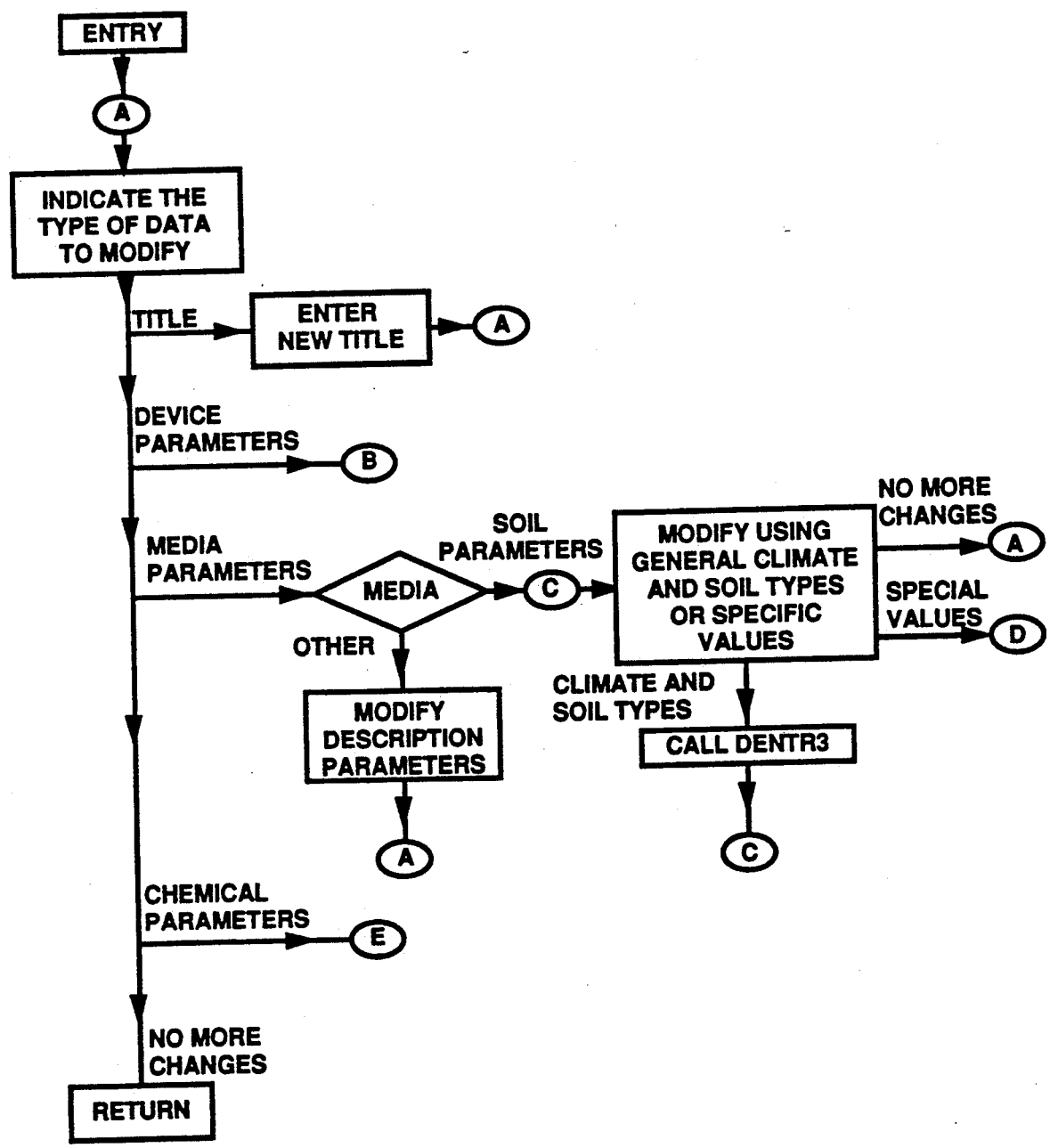
FIG. 19a–19e and 20 are flowcharts of a preferred embodiment for modifying data inputs.
Figure 19B:
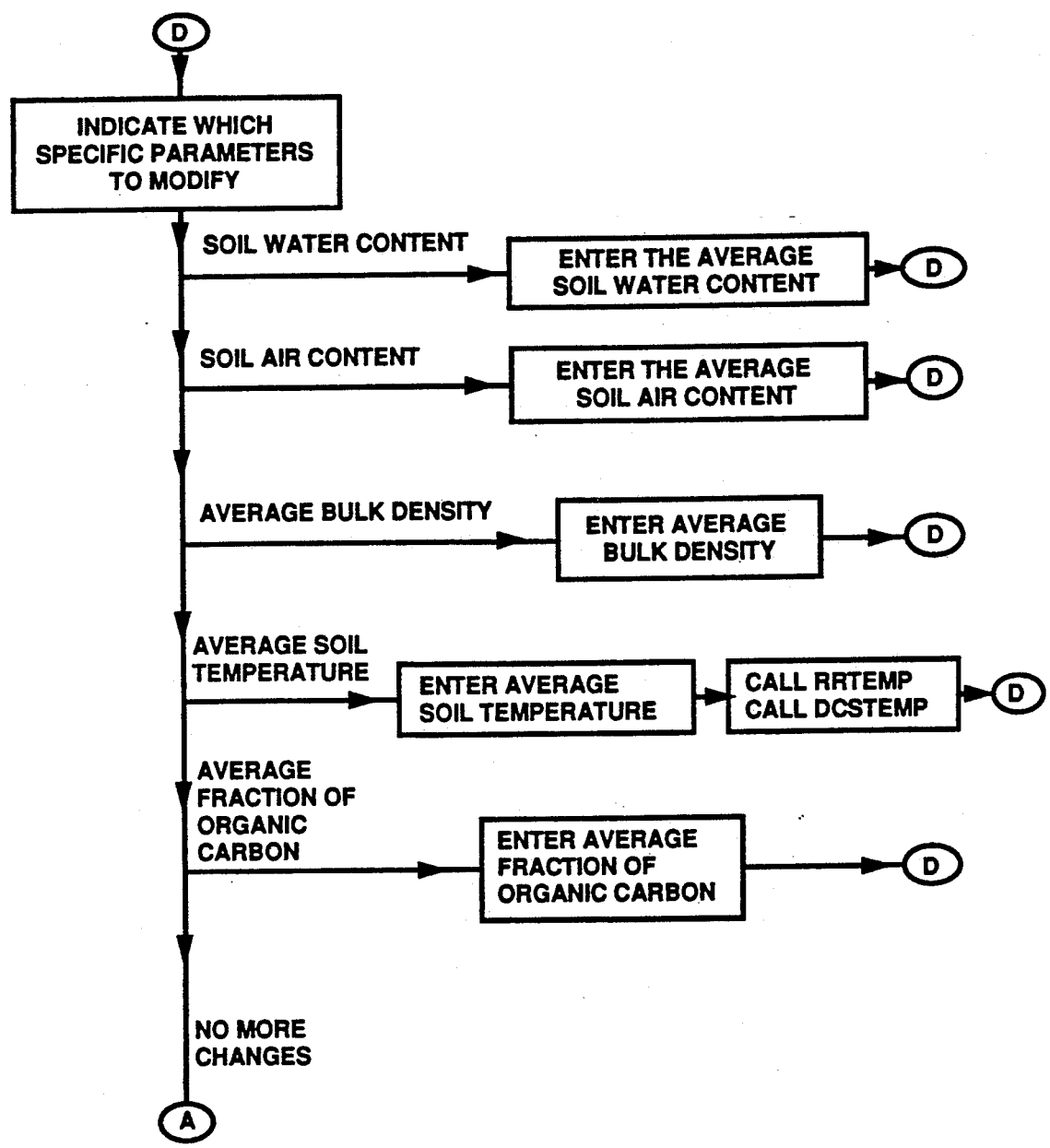
Figure 19C:
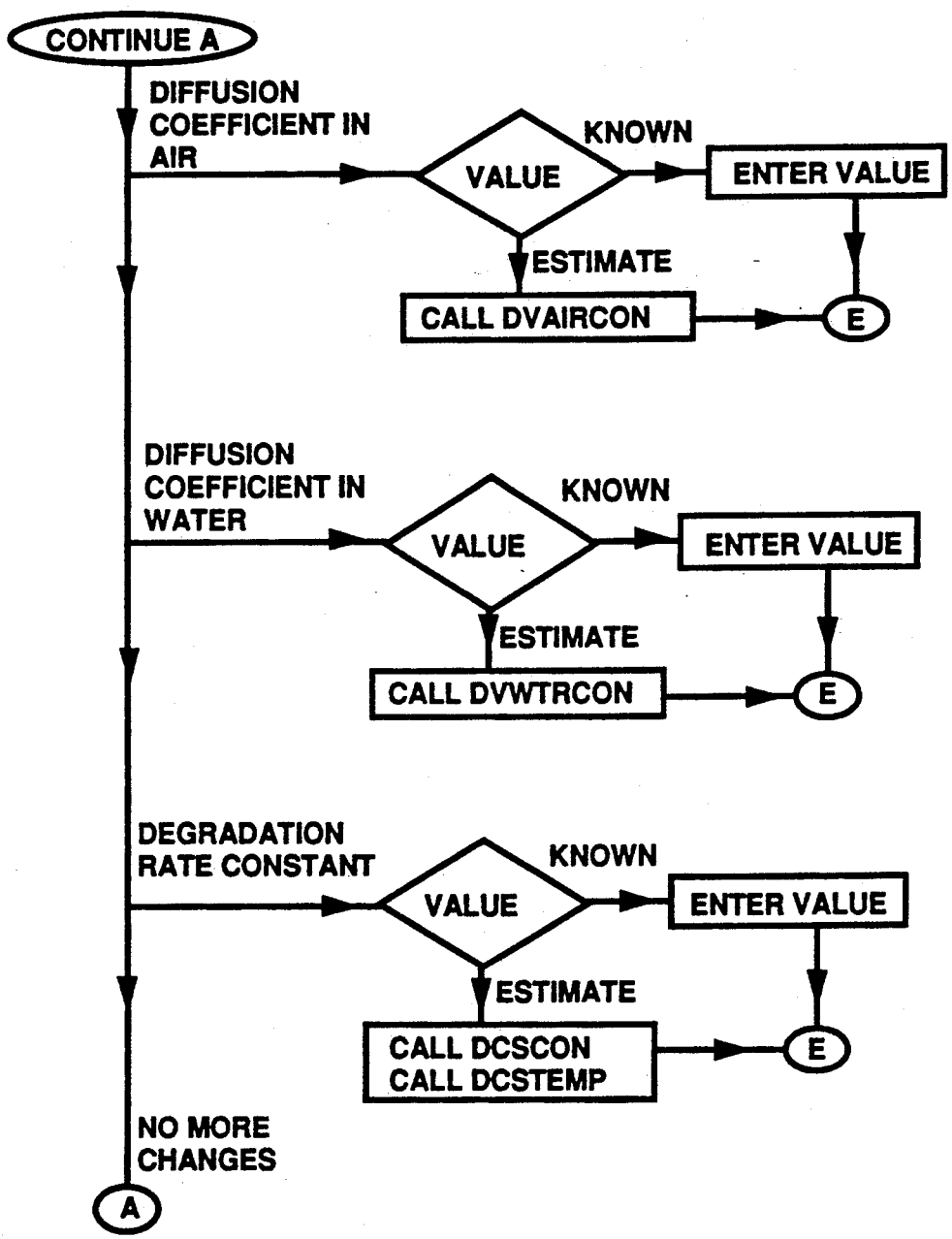
Figure 19D:
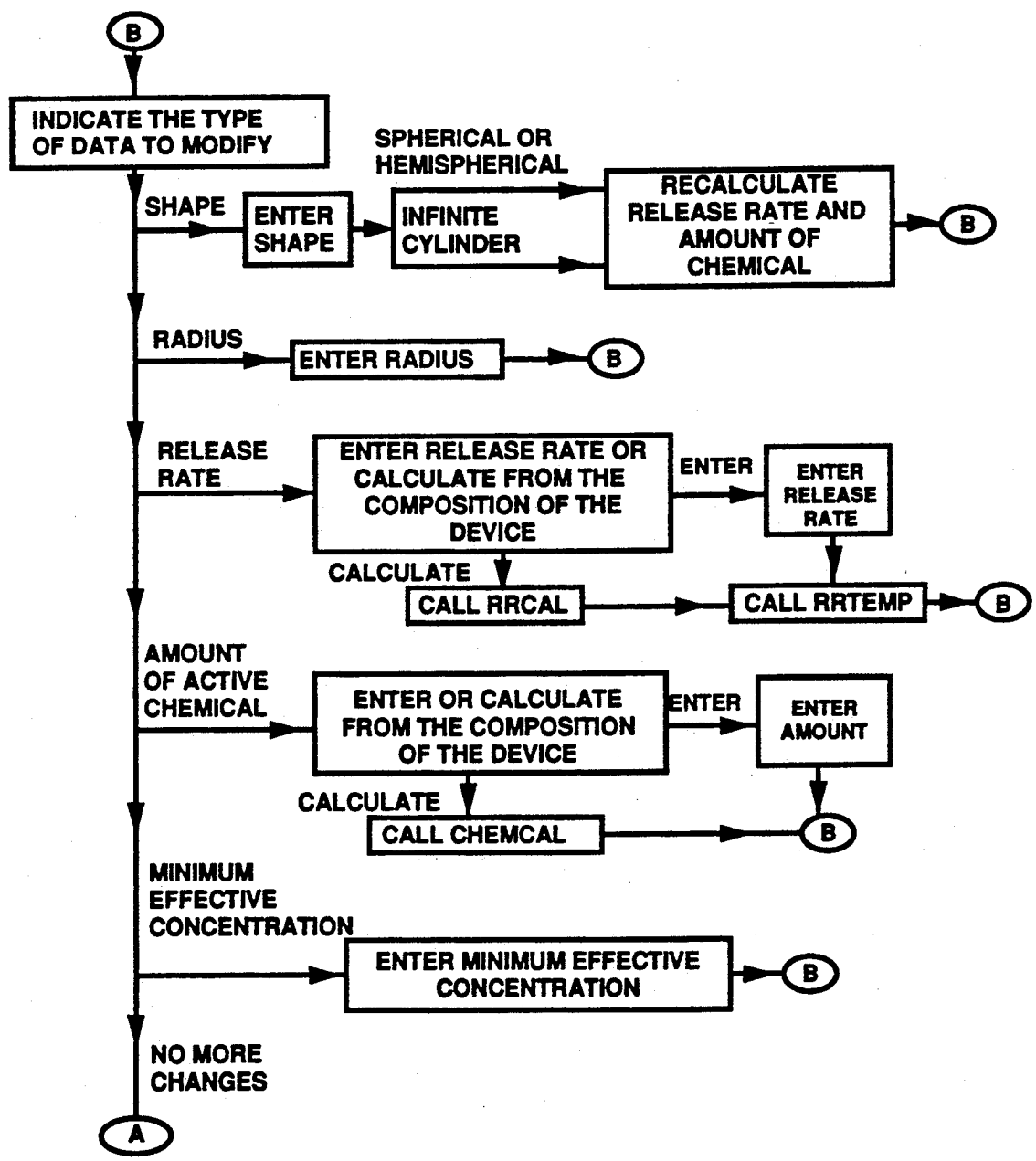
Figure 19E:
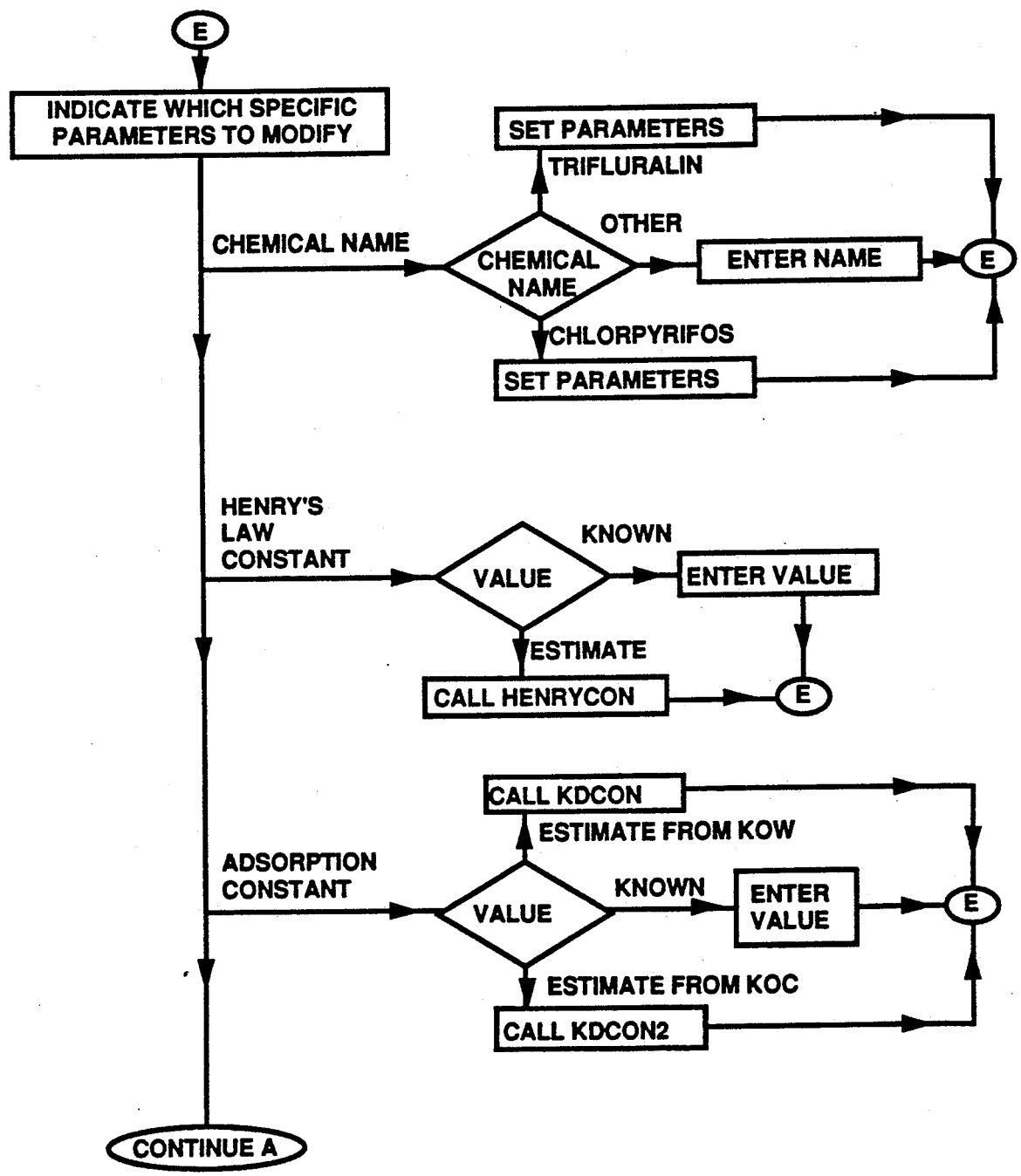
Figure 20:
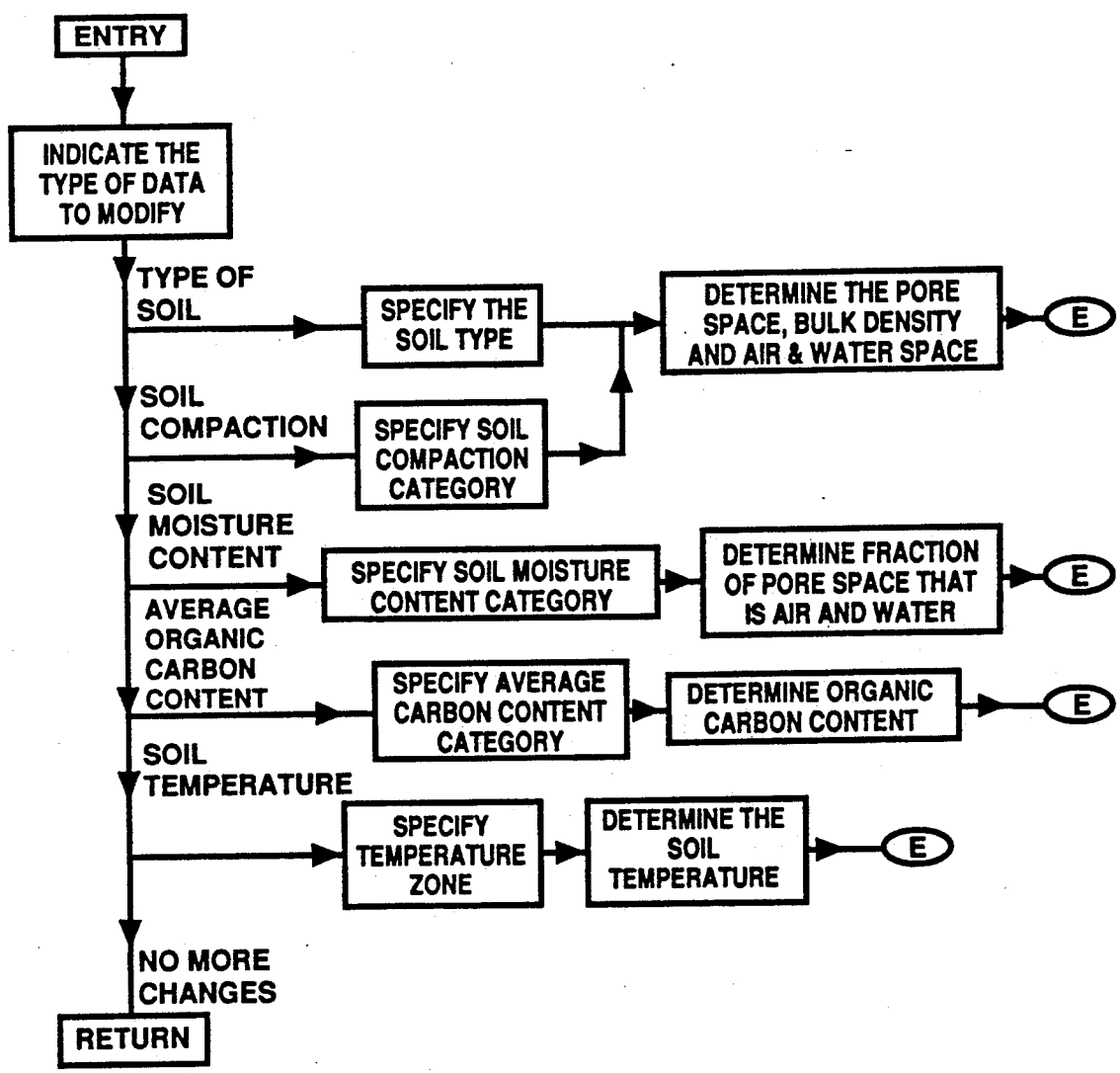

After the user has entered all of the data on the controlled release device, soil characteristics and chemical characteristics, the data values will be echoed back on the screen 32. The user then will be asked if he wants to store the data in a file and the data will be stored depending on the user's response, as illustrated in the flowchart of FIG. 18. Finally, the user will be prompted as to whether he wishes to run the simulation, modify the data, or go back to the beginning of the program. If the user chooses to run the simulation, the results preferably will be printed on the screen 32. After the simulation is completed, preferably the questions will again appear on the screen 32.

Figure 23:
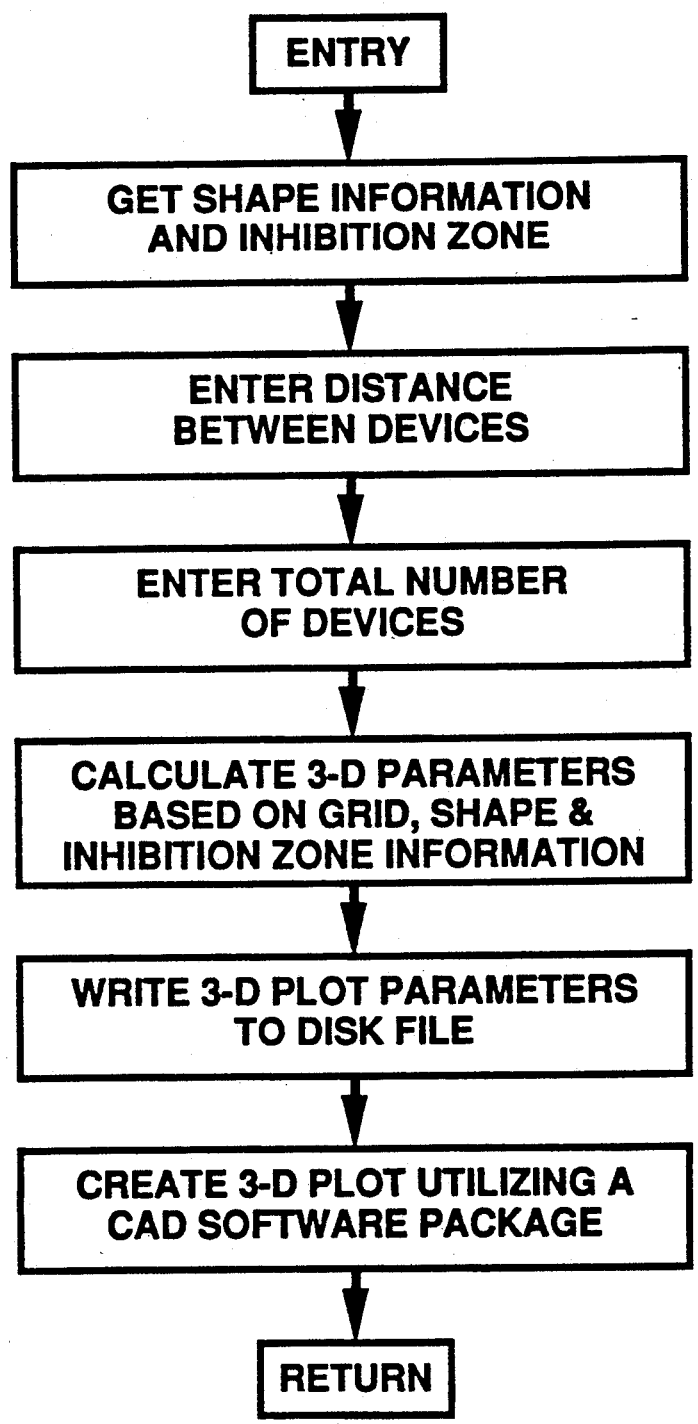
FIG. 23 is a flowchart of a preferred embodiment of the logic for a subroutine for creating a three-dimensional graphical representation of the device and the device's inhibition zone.
Figure 24:
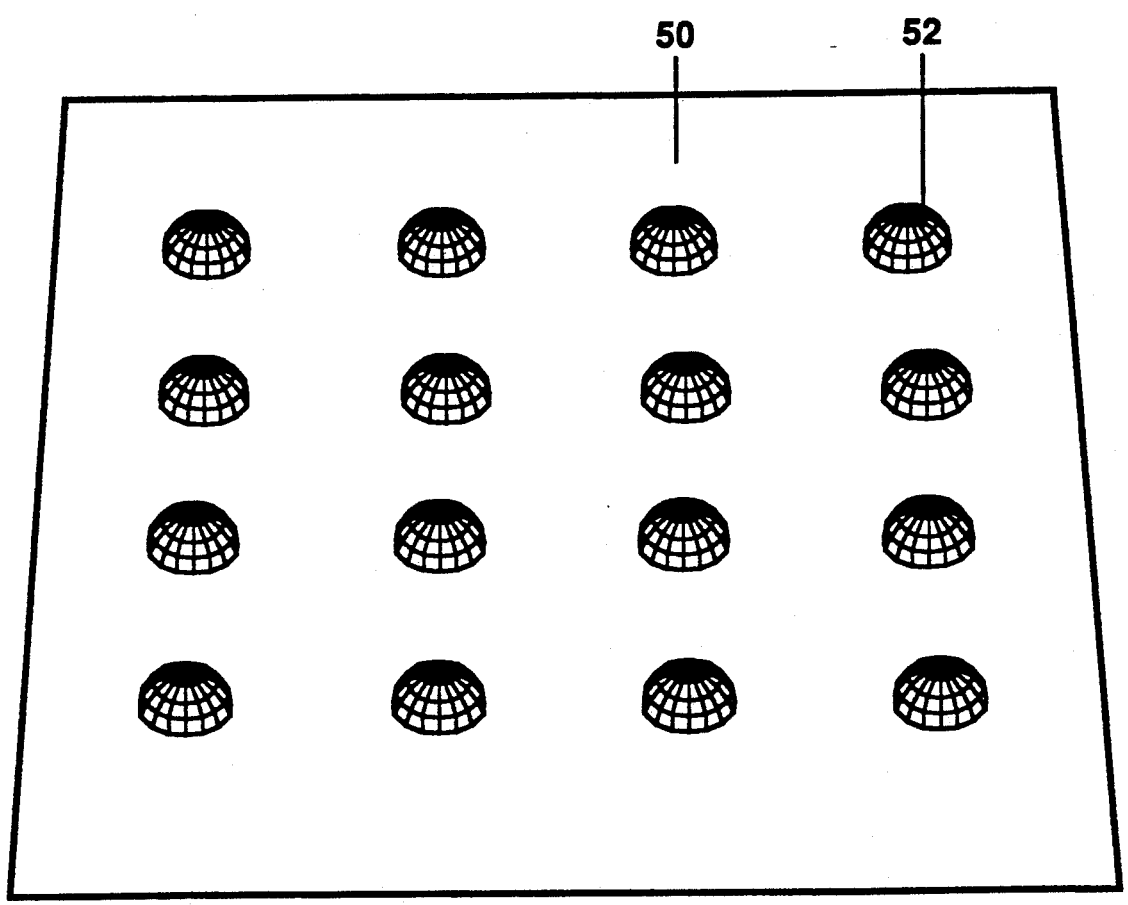
FIG. 24 illustrates a controlled release system.
Figure 25:
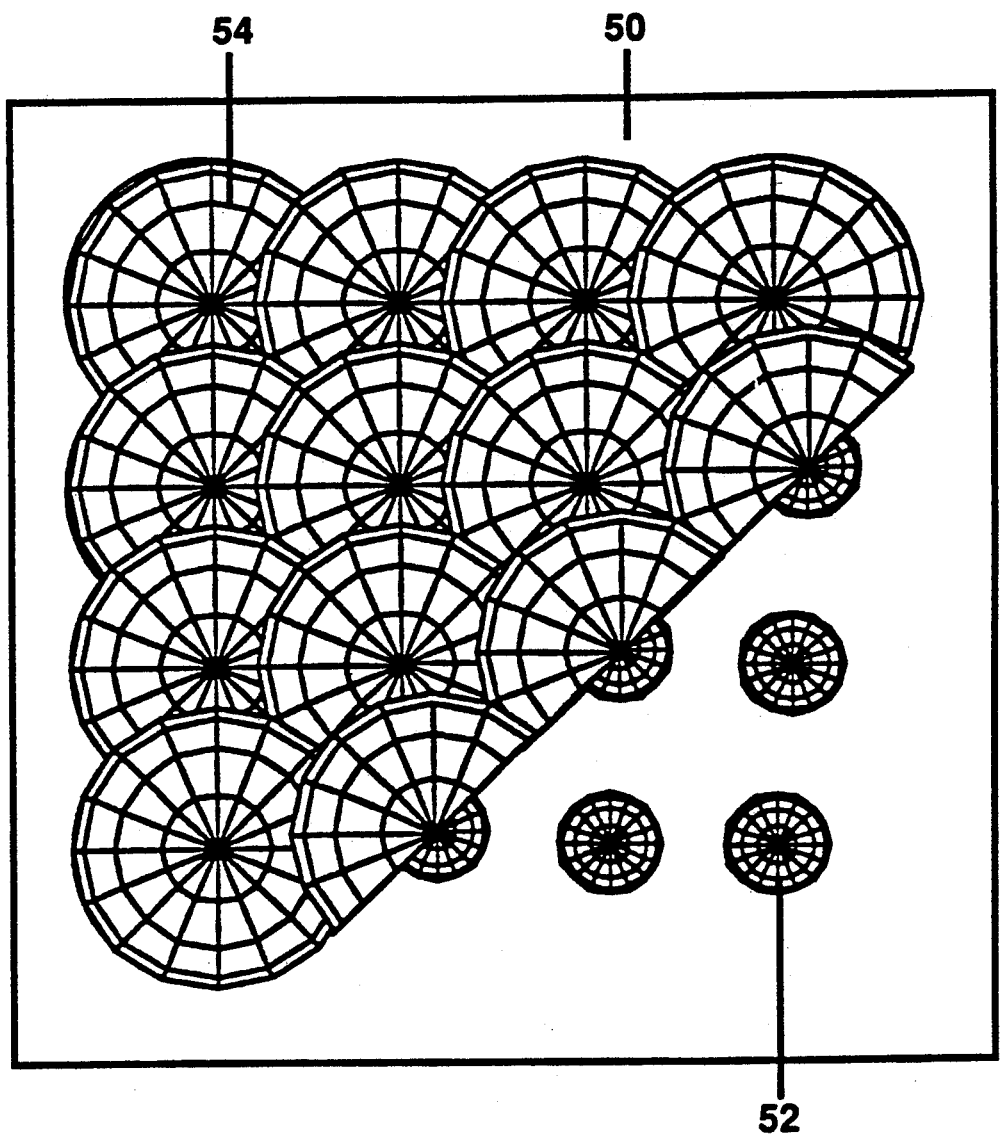
FIG. 25 illustrates a three-dimensional representation of a top view of a controlled release device and the device's inhibition zone.
Figure 26:
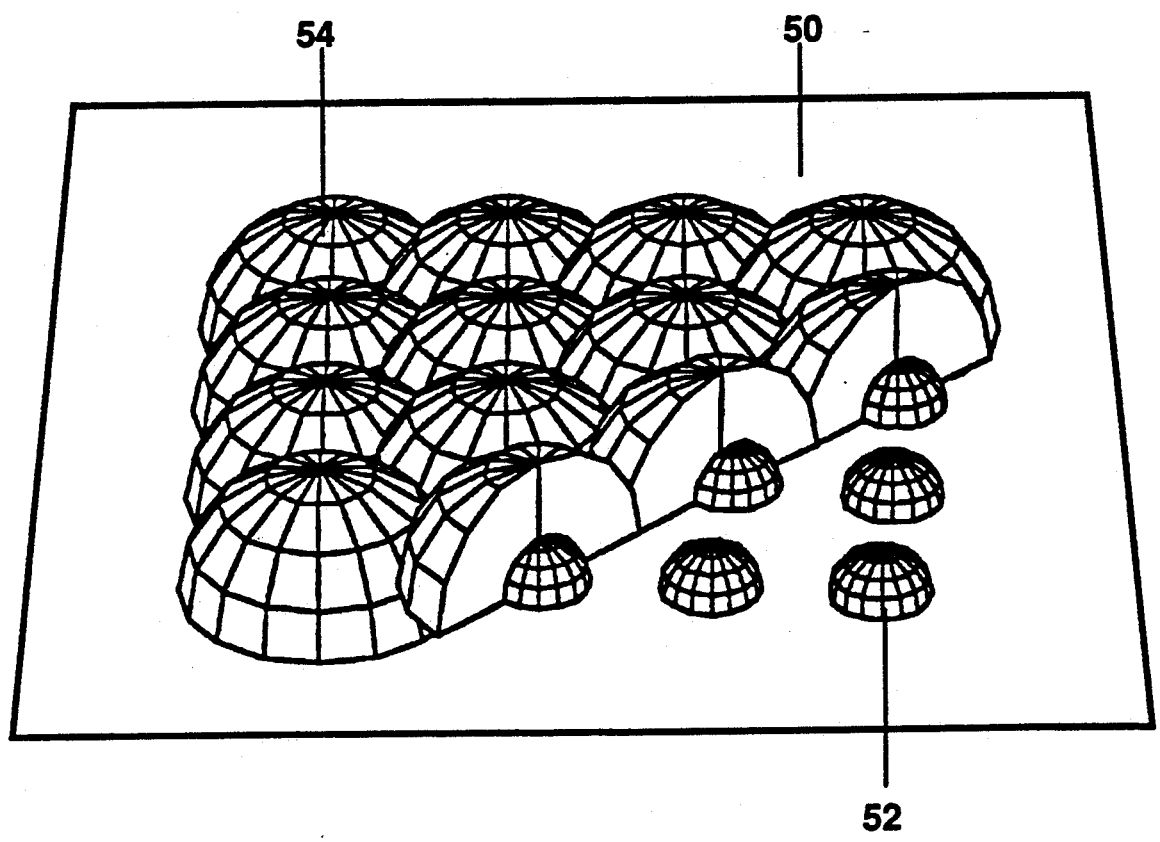
FIG. 26 illustrates a three-dimensional representation of a partial side view of a controlled release device and the device's inhibition zone.

Preferably the system 40 also includes logic for generating and displaying a three-dimensional graphical representation on picture of the devices and their effective zones based on a selected spacing betWeen the devices. A flowchart of a preferred embodiment of the logic for this feature is illustrated in FIG. 23. Preferably, data on the size and shape of the device and the size of the effective zone Will be used with the spacing between devices which is specified by the user, to prepare a file containing plot parameters to produce a three-dimensional plot. The plotting may be implemented by using one of several commercially available CAD software packages. For example, FIG. 24 illustrates a three-dimensional picture showing one of the exemplary embodiments of the controlled release system which includes a sheet 50 with attached hemispherial devices 52. The three-dimensional plot logic preferably includes the capabilitY to generate and display selected views of the devices 52 and their effective zones 54 such as the overhead view and partial side view illustrated in FIGS. 25 and 26, respectively. In this manner the user may selectively produce any of a series of three-dimensional vieWs for all programmed device shapes and configurations. Preferably, after the simulation is completed and the desired plots produced, the previous questions Will again appear on the screen 32.

As indicated above, the preferred embodiment of the knowledge system contains the option to modify the data before any simulation is run. Flowcharts for a preferred embodiment of the logic of this option are illustrated in FIGS. 19a–19d and 20. This modification may be done if a data set is retrieved from an existing file or if it is entered as part of the current system operation. The modification routine is based on the previously described data entry routine; however, the modification routine allows the user to modify the value of one or more parameters independently of other parameters. Of course, changes in the shape, radius and soil temperature will affect other values because of interdependencies. The user may also change the soil characteristics using either or both of the two data entry methods. Data modifications allow the user to determine the effect of variation in one or more parameters on the performance characteristics of the device.

Figure 21:
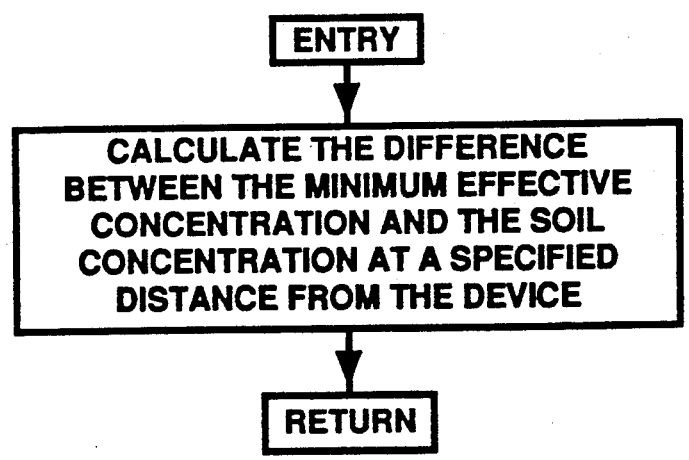
FIG. 21 is a flowchart of a preferred embodiment of the logic for a subroutine for calculating the concentration profile of the active chemical in the media.

After all the data is entered or modifications have been completed, the system 40 uses predetermined logic to calculate the concentration profile of the active chemical in the soil as illustrated in the flowchart of FIG. 21. The concentration profile is calculated by accounting for the movement of the chemical in the pore water and pore air, by accounting for the sorption of the chemical in the organic matter in the soil and by accounting for the degradation of the chemical in the soil. The calculations assume a quasisteady state release rate from the device. The profile has the highest soil concentration at the device surface and the concentration decreases with distance from the device. The formulations used in the presently preferred embodiment for spherical or hemispherical devices are as follows:

$$RWTR = ASWC + (ASAC)(HLC) = (ABDS)(KD)$$

$$RAIR = ASWC/HLC + ASAC + (ABDS)(KD)/HLC$$

$$DV = (DVAIR)(ASAC)10/3(ATSP) 2$$

$$DL = (DVWTR)(ASAC)10/3(ATSP) 2$$

$$DEFF = (DL/RWTR + DV/RAIR)(86400)$$

$$ALPHA = (4.0)(\pi)(DEFF)((1.0 + (DEVR)(DCS1/DEFF))$$

$$CONT =$$

$$(RRT/ALPHA)\exp((-1)(DCS1/DEFF)(RAD - DEVR))$$

Where RWTR is the proportion of the active chemical in the pore water;
RWAIR is the proportion of the active chemical in the pore air;
DV is the apparent vapor phase diffusion coefficient of the active chemical;
DL is the apparent liquid phase diffusion coefficient of the active chemical;
DEFF is the effective diffusion coefficient of the active chemical;
ASWC is the Water content of the soil;
ASAC is the air content of the soil;
HLC is the Henry's Law constant;
KD is the sorption constant;
ABDS is the bulk density of the soil;
DVAIR is the diffusion coefficient of the actiVe chemical in pore air;
DVWTR is the diffusion coefficient of the active chemical in pore water;
DCS1 is the degradation rate of the active chemical at the specified soil temperature;
RRT is the release rate of the active chemical from the device at the specified temperature;
CONT is the concentration of active chemical in the soil at the distance;
RAD is the distance from the center of the device for a sphere or from the center of the flat face for a hemisphere; and
ALPHA is an intermediate calculation value.

Figure 22:
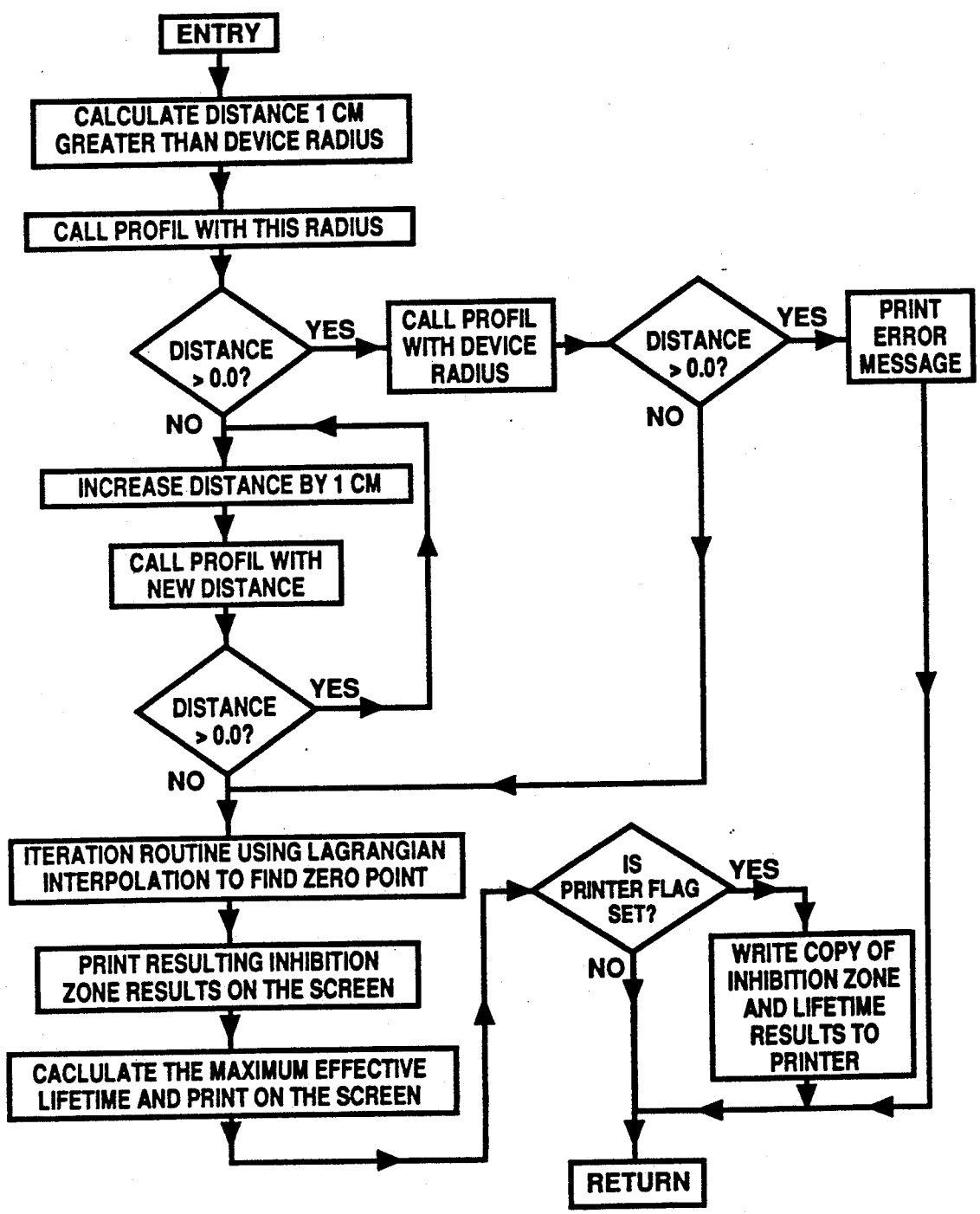
FIG. 22 is a flowchart of a preferred embodiment of the logic for a subroutine for running a simulation of the device.

The effective zone is preferably calculated from the concentration profile of the chemical in the soil and the minimum effective concentration as illustrated in the flowchart of FIG. 22. The distance at which the difference between the concentration in the soil and the minimum effective concentration is zero is the effective zone. The zero point is preferably determined by using a Lagrangian interpolation method. As discussed above, the effective zone is the distance from the device at which the concentration in the soil (this includes pore water and pore air as well as the amount absorbed on the organic carbon) is equal to the minimum effective concentration.

The effective lifetime of the device is calculated from the release rate of the device which is calculated as discussed above and the amount of active chemical in the device as illustrated in the flowchart of FIG. 22. A correction factor of 2.4 is preferably used to account for differences from in vitro measurements of release rate to soil rates as discussed by Cline et al (1982) and Burton et al. (1986). The equations for the calculations used in the presently preferred embodiment are as follows:

$$MEL = (2.4)(CHEMA)(1000) = )/(RRt)(365)$$

Where MEL is the maximum effective lifetime (years);
CHEMA is the total amount of active chemical in the device (mg); and
RRt is the release rate of the active chemical from the device at the specified soil temperature ($\mu g$/day).

The calculations used in the preferred embodiment lead to conservative estimates of the lifetime of the device. One factor which contributes to the conservativeness is a simulation rate that is higher than that likely to be experienced during months of the year when temperatures are less than that used in the simulation. Furthermore, the system of the preferred embodiment assumes that a calculated profile in the soil is not affected by the presence of other devices. If other devices are present, then the concentration of the active chemical between the devices could be higher than that predicted for one device. Thus, the predictions for one device are likely to be conservative in zones where the concentration profiles of the devices overlap.

Therefore, the present invention provides a user with a method for simulating the performance characteristics of a controlled release device. The user may input different design parameters for the device and/or environmental characteristics such as soil and temperature characteristics. The user may either use the present invention to specifically determine the performance of a device or the present invention may be used to design a device which is best suited for particular conditions.

The foregoing description of the exemplary and preferred embodiments of the present invention has been presented for purposes of illustration and description. They are not intended to be exhaustive or to limit the invention to the precise forms disclosed, and obviously many modifications and variations are possible in light of the above. The embodiments were chosen and described in order to best explain the principle of the invention and its practical applications and to thereby enable others skilled in the art to best utilize the invention in various embodiments and with various modifications as are suited to the particular use contemplated. It is intended that the scope of the invention be defined by the following claims, including all equivalents.

We claim:

1. A knowledge system for simulating the performance of a controlled release device for producing a sustained release of an active chemical into a media, the controlled release device having device and active chemical parameters, the system comprising a computer having:

input means for selectively entering at least one of a plurality of input data parameters, including device parameters, media parameters, active chemical parameters and, device release rate; and second parameters including device minimum effective inhibition zone, and an effective lifetime of the device;

a judgmental knowledge base including logic of 1) determining at least one of the second parameters from the first parameters; and 2) determining one of the first parameters from the other of the first parameters and the second parameters;

a display operatively connected to the judgmental knowledge base to display the results of the determinations.

2. The knowledge system of claim 1 further comprising a data base including media parameters and active chemical parameters, the judgmental knowledge base operatively connected to access the data in the database.

3. The knowledge system of claim 2 wherein the media comprises a soil.

4. The knowledge system of claim 1 wherein the knowledge system logic includes means for calculating the release rate of the controlled release device and means for calculating the active chemical parameters from the input parameters.

5. The knowledge system of claim 1 wherein the logic for calculating the effective lifetime of the controlled release device includes means for determining the shortest effective lifetime and the maximum effective lifetime of the controlled release device.

6. The knowledge system of claim 1 further comprising modifying logic means for a user to modify entered data after the results have been displayed.

7. The knowledge system of claim 1 further comprising logic means for generating a three-dimensional graphical representation of the device and the effective zone of the device on the display.

8. The knowledge system of claim 7 further comprising a database including media parameters and active chemical parameters, the judgmental knowledge base operatively connected to access data in the database.

9. The knowledge system of claim 8 wherein the knowledge system logic includes means for calculating the release rate of the controlled release device and means for calculating the active chemical parameters from the input parameters.

10. A knowledge system for simulating the performance of a controlled release device for producing a sustained release of an active chemical into a media, the controlled release device having device and active chemical configuration parameters, the system comprising a computer having;

input means for selectively entering at least one of a plurality of input data parameters, the data parameters including first parameters including device parameters, media parameters, active chemical parameters and, device release rate; and second parameters including device minimum effective inhibition zone, and an effective lifetime of the device; and for selectively entering whether one of the first or the second parameters is to be determined;

a judgmental knowledge base operatively connected to receive data from the input means, the judgmental knowledge base including logic for 1) determining the second parameters from the first parameters and 2) determining one of the first parameters from the other of the first parameters and the second parameters;

a database including media parameters and active chemical parameters, the judgmental knowledge base operatively connected to access the data in the database;

a display operatively connected to the judgmental knowledge base to display the results of the determinations;

modifying logic means for a user to modify entered data after the results have been displayed; and logic means for generating a three-dimensional configuration of the device and the effective zone of the device on the display.

11. The knowledge system of claim 10 wherein the knowledge system logic includes means for calculating the release rate and means for calculating active chemical parameters.

12. The knowledge system of claim 11 wherein the knowledge system logic includes means for calculating the release rate of the controlled release device and means for calculating active chemical parameters from the input parameters.

13. The knowledge system of claim 10 wherein the logic for calculating the effective lifetime of the controlled release device includes means for determining the shortest effective lifetime and the maximum effective lifetime of the controlled release device.

14. A method for determining the performance characteristics of a controlled release device, the controlled release device delivering a sustained release of an active chemical to a media, the method comprising the steps of:

selecting at least one of a plurality of data parameters for the controlled release device to be designed, the data parameters including device parameters, media parameters, active chemical parameters, minimum effective inhibition zone, and effective lifetime of the device;

determining values for the non-selected data parameters;

determining the release rate of the active chemical from the controlled release device from the non-selected data parameters; and from the release rate, determining the values for the selected parameters.

15. The method of claim 14 further comprising the step of:

determining whether the selected parameter values meet predetermined performance characteristics;

if the selected values do not meet the predetermined performance characteristics, determining modified values for the non-selected data parameters; and repeating the steps of determining the release rate and determining the values of the selected parameters.

16. The method of claim 14 further comprising the step of generating a three-dimensional display of 1) the device and 2) the minimum effective inhibition zone of the device with the selected parameters.

17. The method of claim 15 further comprising the step of generating a three-dimensional display of 1) the device and 2) the minimum effective inhibition zone of the device with the selected parameters.

* * * * *

UNITED STATES PATENT AND TRADEMARK OFFICE
CERTIFICATE OF CORRECTION

PATENT NO. : 5,019,998

DATED : May 28, 1991

INVENTOR(S) : Christina E. Cowan et al.

Page 1 of 7

It is certified that error appears in the above-identified patent and that said Letters Patent is hereby corrected as shown below:

IN THE REFERENCES CITED

On the cover page under PUBLICATIONS please insert --"Long-Term Controlled-Release of Herbicides: Root-Growth-Inhibiting Biobarrier Technology", Van Voris et al. (Report)--.

In column 1, line 7, please delete "Which" and substitute therefor --which--.

IN THE BACKGROUND OF THE INVENTION

In column 1, line 43, please delete "actiVe" and substitute therefor --active--.

In column 1, line 46, please delete "Which" and substitute therefor --which--.

In column 2, line 8, please delete "Which" and substitute therefor --which--.

In column 2, line 10, please delete "BeloW" and substitute therefor --below--.

In column 2, line 22, please delete "spunbonded" and substitute therefor --spun-bounded--.

In column 2, line 41, please delete "Variation" and substitute therefor --variation--.

UNITED STATES PATENT AND TRADEMARK OFFICE
CERTIFICATE OF CORRECTION

PATENT NO. : 5,019,998

DATED : May 28, 1991

INVENTOR(S) : Christina E. Cowan et al.

It is certified that error appears in the above-identified patent and that said Letters Patent is hereby corrected as shown below:

In column 2, lines 44 and 45, please delete "Variations" and substitute therefor --variations--.

In column 2, line 50, please delete "Wide" and substitute therefor --wide--.

In column 3, line 43, please delete "proVide" and substitute therefor --provide--.

IN THE SUMMARY OF THE INVENTION

In column 3, line 64, after "device" please insert --,--.

In column 4, line 27, please delete "Which" and substitute therefor --which--.

IN THE BRIEF DESCRIPTION OF THE DRAWINGS

In column 4, line 61, please delete "floWchart" and substitute therefor --flowchart--.

In column 6, line 5, please delete "Well" and substitute therefor --well--.

In column 6, line 20, please delete "Whether" and substitute therefor --whether--.

UNITED STATES PATENT AND TRADEMARK OFFICE
CERTIFICATE OF CORRECTION

PATENT NO. : 5,019,998

DATED : May 28, 1991

INVENTOR(S) : Christina E. Cowan et al.

It is certified that error appears in the above-identified patent and that said Letters Patent is hereby corrected as shown below:

In column 7, line 34, please delete "Was" and substitute therefor --was--.

In column 7, line 50, please delete "Black" and substitute therefor --black--.

In column 7, line 51, please delete "Polyethylene" and substitute therefor --polyethylene--.

In column 8, line 33, please delete "With" and substitute therefor --with--.

In column 8, line 43, please delete "polyser-carrier" and substitute therefor --polymer-carrier--.

In column 8, line 49, please delete "Which" and substitute therefor --which--.

In column 9, line 19, after "constant" please insert --.--.

In column 9, line 21, after "changes" please insert --.--.

In column 9, line 35, please delete "1.333(DEVR 3)($\pi$)" and substitute therefor --1.333(DEVR^3)($\pi$)--.

In column 9, line 36, please delete "1.333(DEVR 3)($\pi$)(0.5)" and substitute therefor --1.333(DEVR^3)($\pi$)(0.5)--.

UNITED STATES PATENT AND TRADEMARK OFFICE
CERTIFICATE OF CORRECTION

PATENT NO. : 5,019,998

DATED : May 28, 1991

INVENTOR(S) : Christina E. Cowan et al.

It is certified that error appears in the above-identified patent and that said Letters Patent is hereby corrected as shown below:

In column 9, line 37, before "signifies" please insert --^--.

In column 9, line 41, after "released" please insert --.--.

In column 10, line 16, please delete "Water" and substitute therefor --water--.

In column 10, lines 21 and 22, please delete "Watered" and substitute therefor --watered--.

In column 10, line 35, please delete "Which" and substitute therefor --which--.

In column 10, line 37, please delete "Will" and substitute therefor --will--.

In column 10, line 64, please delete "an" and substitute therefor --can--.

In column 10, line 66, please delete "Which" and substitute therefor --which--.

In column 13, lines 2 and 3, please delete "octanol-Water" and substitute therefor --octanol-water--.

In column 13, line 9, please delete "KD=(KFOC)(10 (0 419+0.881(LOG10(KOW))))" and substitute therefor --KD=(KFOC)(10^(0 419+0.881(LOG10(KOW))))--.

UNITED STATES PATENT AND TRADEMARK OFFICE
CERTIFICATE OF CORRECTION

PATENT NO. : 5,019,998

DATED : May 28, 1991

INVENTOR(S) : Christina E. Cowan et al.

It is certified that error appears in the above-identified patent and that said Letters Patent is hereby corrected as shown below:

In column 13, line 19, please delete "Weight" and substitute therefor --weight--.

In column 13, lines 25 and 27, please delete
"DVAIR = ((0.001)(TA 1.75)SQRT(1.0/MCMP) +
        1.0/28.8)/((DIFVOL 0.333) + (20.1 0.333) 2)"
and substitute therefor
--DVAIR = ((0.001)(TA^1.75)SQRT(1.0/MCMP) +
        1.0/28.8)/((DIFVOL^0.333) + (20.1^0.333)^2)"--.

In column 13, line 30, please delete "(cm 2/sec)" and substitute therefor --(cm^2/sec)--.

In column 13, line 32, please delete "MCMF" and substitute therefor --MCMP--; and delete "Weight" and substitute therefor --weight--.

In column 13, lines 45 and 46, please delete
"DVWTR = ((7.4E-8(TA)(SQRT((2.6)(18.0)/(-
  MVOL 6)))"
and substitute therefor
    --DVWTR = ((7.4E-8)((TA)(SQRT((2.6)(18.0)/(MVOL^6)))--.

In column 13, line 49, please delete "(cm 2/sec)" and substitute therefor --(cm^2/sec)--.

In column 14, line 30, please delete "betWeen" and substitute therefor --between--.

UNITED STATES PATENT AND TRADEMARK OFFICE
CERTIFICATE OF CORRECTION

PATENT NO. : 5,019,998

DATED : May 28, 1991

INVENTOR(S) : Christina E. Cowan et al.

It is certified that error appears in the above-identified patent and that said Letters Patent is hereby corrected as shown below:

In column 14, line 34, please delete "Will" and substitute therefor --will--.

In column 14, lines 42 and 43, please delete "hemispherial" and substitute therefor --hemispherical--.

In column 14, line 44, please delete "capabilitY" and substitute therefor --capability--.

In column 14, line 49, please delete "vieWs" and substitute therefor --views--.

In column 14, line 52, please delete "Will" and substitute therefor --will--.

In column 15, line 23, please delete "DV = (DVAIR)(ASAC)10/3(ATSP) 2" and substitute therefor --DV = (DVAIR)(ASAC)10/3(ATSP)^2--.

In column 15, line 24, please delete "DL = (DVWTR)(ASAC)10/3(ATSP) 2" and substitute therefor --DL = (DVWTR)(ASAC)10/3(ATSP)^2--.

In column 15, line 29, after "CONT =" please insert --(RRT/ALPHA)exp((-1)(DCS1/DEFF)(RAD - DEVR))--, and delete line 30.

In column 15, line 42, please delete "Water" and substitute therefor --water--.

UNITED STATES PATENT AND TRADEMARK OFFICE
CERTIFICATE OF CORRECTION

PATENT NO. : 5,019,998

DATED : May 28, 1991

INVENTOR(S) : Christina E. Cowan et al.

Page 7 of 7

It is certified that error appears in the above-identified patent and that said Letters Patent is hereby corrected as shown below:

In column 15, line 47, please delete "actiVe" and substitute therefor --active--.

IN THE CLAIMS

Col. 17, Claim 1, line 14, after "logic" please delete "of" and substitute therefor --for--.

Col. 17, Claim 10, line 6, please delete ";" and substitute therefor --:--.

Signed and Sealed this

Twenty-seventh Day of April, 1993

*Attest:*

MICHAEL K. KIRK

*Attesting Officer*   *Acting Commissioner of Patents and Trademarks*